US011953853B2

(12) United States Patent
Watanabe et al.

(10) Patent No.: US 11,953,853 B2
(45) Date of Patent: Apr. 9, 2024

(54) IMAGE FORMING APPARATUS

(71) Applicant: CANON KABUSHIKI KAISHA, Tokyo (JP)

(72) Inventors: Toshiyuki Watanabe, Kanagawa (JP); Osamu Sasaoka, Kanagawa (JP); Akinori Yokota, Tokyo (JP); Masafumi Maeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/062,636

(22) Filed: Dec. 7, 2022

(65) Prior Publication Data

US 2023/0213883 A1 Jul. 6, 2023

(30) Foreign Application Priority Data

Dec. 13, 2021 (JP) ................................ 2021-201845

(51) Int. Cl.
*G03G 15/00* (2006.01)
*G03G 15/16* (2006.01)
*G03G 21/16* (2006.01)

(52) U.S. Cl.
CPC ....... *G03G 15/757* (2013.01); *G03G 15/1615* (2013.01); *G03G 21/1647* (2013.01); *G03G 2221/1657* (2013.01)

(58) Field of Classification Search
CPC ............ G03G 15/757; G03G 15/1615; G03G 21/1647; G03G 2221/1657; G03G 21/16
See application file for complete search history.

(56) References Cited

U.S. PATENT DOCUMENTS 9,946,219 B2 * 4/2018 Mori .................. G03G 21/1647
2013/0302066 A1 * 11/2013 Kawai .................... G03G 15/50 399/167
2016/0062299 A1 * 3/2016 Hirose ............... G03G 15/1615 399/167
2019/0025751 A1 * 1/2019 Wu ......................... F16D 1/112
2021/0033171 A1 * 2/2021 Matsuda ............. F16H 57/0031

FOREIGN PATENT DOCUMENTS

CN 104950616 A * 9/2015 ............ F16D 13/08
JP S929868 A 2/1984
JP 2003208024 A 7/2003
JP 2011203528 A 10/2011

* cited by examiner

*Primary Examiner* — Francis C Gray
(74) *Attorney, Agent, or Firm* — ROSSI KIMMS & McDOWELL LLP

(57) ABSTRACT

An image forming apparatus includes a drive source, an object configured to be driven by the drive source, and a drive transmission mechanism including a driving member, a driven member, an intermediate member, an urging member, and an actuating portion. The intermediate member is configured to move in an axial direction. The intermediate member includes a shaft portion extending in the axial direction, and a positioning portion configured to determine a position of the driven member in a direction orthogonal to the axis. The shaft portion includes a receiving portion configured to receive a force. The receiving portion is positioned inward of the positioning portion in a radial direction of rotation of the intermediate member.

26 Claims, 25 Drawing Sheets

IMAGE FORMING APPARATUS

BACKGROUND OF THE INVENTION

Field of the Invention

The present invention relates to an image forming apparatus for forming images on sheets.

Description of the Related Art

In image forming apparatuses, mechanical clutch apparatuses are adopted as a drive transmission mechanism for transmitting a driving force of a drive source to a conveyance member for conveying sheets. Japanese Patent Application Laid-Open Publication No. 2003-208024 discloses a mechanical clutch apparatus equipped with a driving gear, an engagement member that is in key engagement with the driving gear, and a driven gear having a ratchet shape that is meshed with the engagement member. According to this document, an annular cam member is arranged in a circumference of a gear shaft of the driven gear, and in a state where the engagement member is moved away from the driven gear in the axial direction by the cam member, drive transmission between the driving gear and the driven gear is released.

According to the configuration disclosed in the above document, the annular cam member is arranged in the circumference of the gear shaft as a configuration for releasing the drive transmission between the driving gear and the driven gear, such that a large space is required to arrange the drive transmission mechanism.

SUMMARY OF THE INVENTION

The present invention provides an image forming apparatus capable of improving a space-saving property of the drive transmission mechanism.

According to one aspect of the invention, an image forming apparatus includes a drive source, an object configured to be driven by the drive source, and a drive transmission mechanism configured to transmit driving force from the drive source to the object, the drive transmission mechanism including a driving member connected to the drive source and configured to be rotated around an axis by the driving force, a driven member connected to the object and configured to rotate around the axis, an intermediate member configured to rotate integrally with the driving member around the axis, an urging member configured to urge the intermediate member toward a first side in an axial direction of the axis, and an actuating portion configured to act on the intermediate member, wherein the intermediate member is configured to move in the axial direction to a first position in which the intermediate member is engaged with the driven member such that the driving force is transmitted to the driven member, and to a second position in which the intermediate member is separated from the driven member such that the driving force is not transmitted to the driven member, the second position being on a second side of the first position in the axial direction, the second side being opposite to the first side, wherein the intermediate member includes a shaft portion extending in the axial direction, and a positioning portion configured to determine a position of the driven member in a direction orthogonal to the axis, wherein the shaft portion includes a receiving portion configured to receive a force, by which the intermediate member is moved from the first position to the second position, from the actuating portion, and wherein the receiving portion is positioned inward of the positioning portion in a radial direction of rotation of the intermediate member.

According to another aspect of the invention, an image forming apparatus includes a drive source, an object configured to be driven by the drive source, and a drive transmission mechanism configured to transmit driving force from the drive source to the object, the drive transmission mechanism including a driving member connected to the drive source and configured to be rotated around an axis by the driving force, a driven member connected to the object and configured to rotate around the axis, an intermediate member configured to rotate integrally with the driven member around the axis, an urging member configured to urge the intermediate member toward a first side in an axial direction of the axis, and an actuating portion configured to act on the intermediate member, wherein the intermediate member is configured to move in the axial direction to a first position in which the intermediate member is engaged with the driving member such that the intermediate member receives the driving force from the driving member, and to a second position in which the intermediate member is separated from the driving member such that the intermediate member does not receive the driving force from the driving member, the second position being on a second side of the first position in the axial direction, the second side being opposite to the first side, wherein the intermediate member includes a shaft portion extending in the axial direction, and a positioning portion configured to determine a position of the driving member in a direction orthogonal to the axis, wherein the shaft portion includes a receiving portion configured to receive a force, by which the intermediate member is moved from the first position to the second position, from the actuating portion, and wherein the receiving portion is positioned inward of the positioning portion in a radial direction of rotation of the intermediate member.

Further features of the present invention will become apparent from the following description of exemplary embodiments with reference to the attached drawings.

DESCRIPTION OF THE EMBODIMENTS

Embodiments according to the present disclosure will be described with reference to the drawings.

First Embodiment

Figure 1:
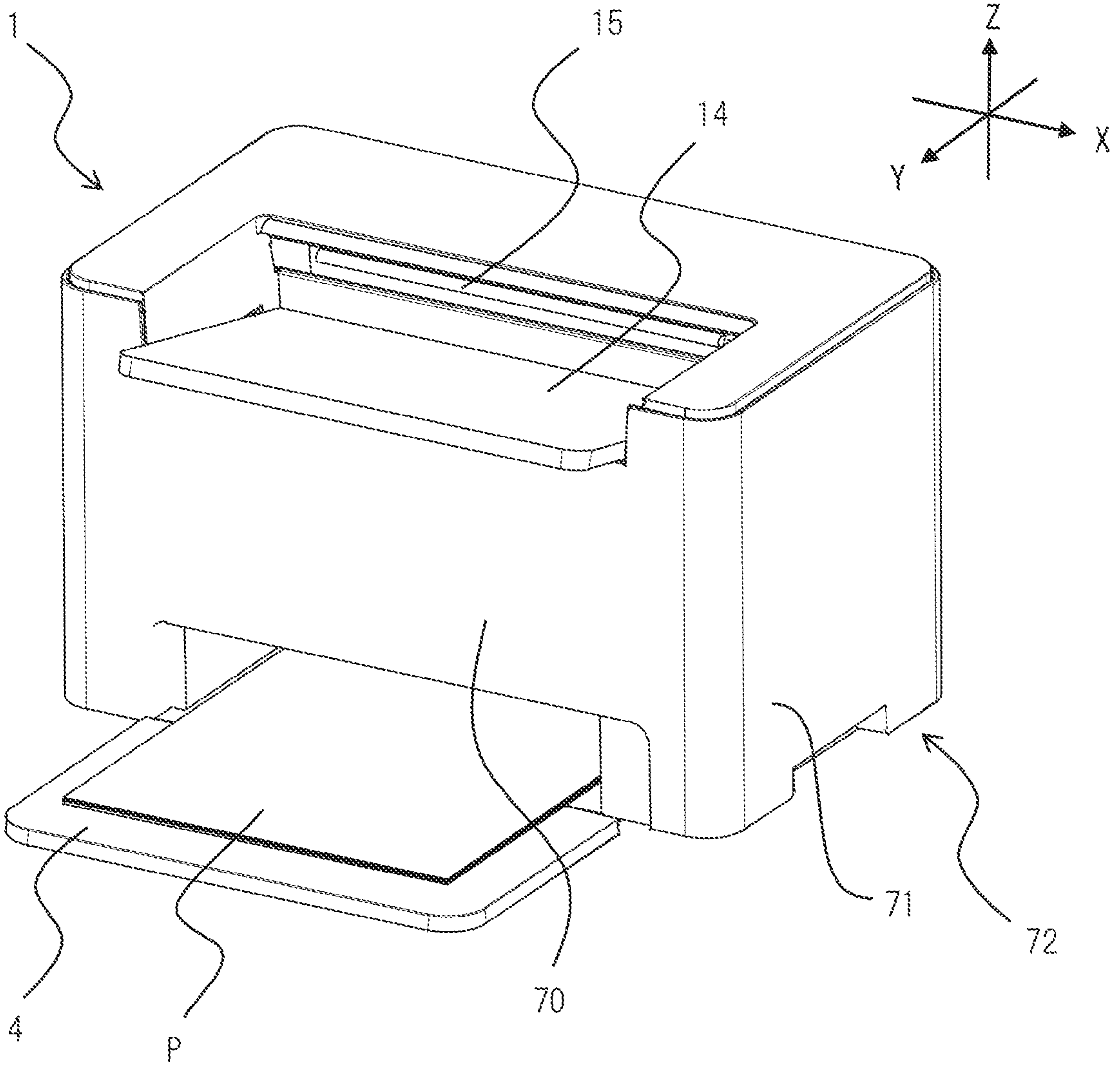
FIG. 1 is a perspective view of an image forming apparatus according to a first embodiment.
Figure 2:
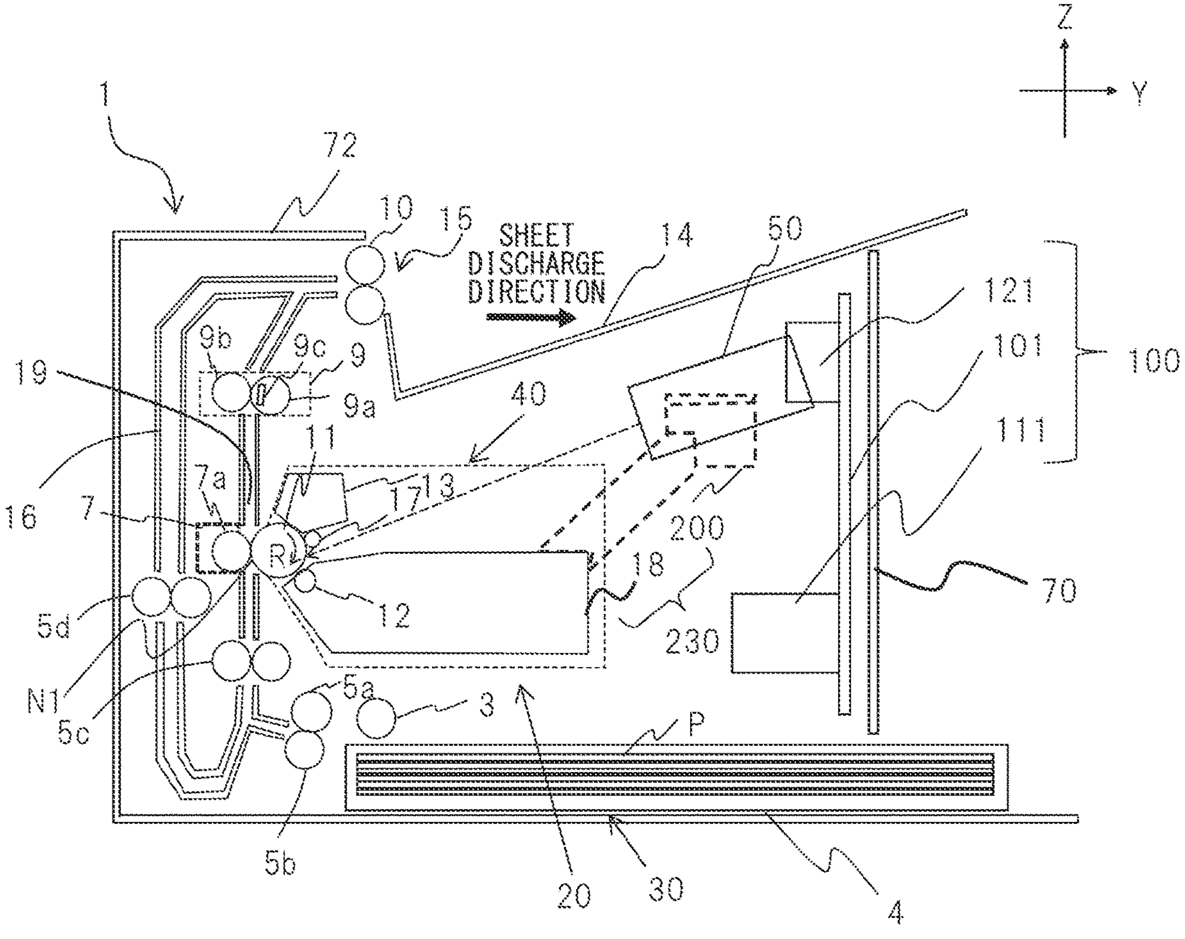
FIG. 2 is a schematic view of the image forming apparatus according to the first embodiment.

FIG. 1 is a perspective view illustrating an image forming apparatus 1 according to a first embodiment. FIG. 2 is a schematic view illustrating a configuration of the image forming apparatus 1. The image forming apparatus 1 is a monochrome printer for forming an image on a recording material based on an image information entered from an external apparatus. Recording materials include sheets formed of various materials, such as paper including plain paper and thick paper, plastic films such as overhead projector (OHP) sheets, special shaped sheets such as envelopes and index paper, and cloth.

In the following description, a height direction, which is a direction opposite to the gravity direction, of the image forming apparatus 1 in a state where the image forming apparatus 1 is installed on a horizontal plane is referred to as a Z direction. A direction that intersects the Z direction and that is parallel with a rotational axis direction, i.e., main scanning direction, of a photosensitive drum 11 described later is referred to as an X direction. The direction that intersects the X direction and the Z direction is referred to as a Y direction. The X direction, the Y direction, and the Z direction are preferably mutually orthogonal. For convenience, a positive side in the X direction can be referred to as a right side and a negative side thereof can be referred to as a left side, a positive side in the Y direction can be referred to as a front side and a negative side thereof can be referred to as a rear side, and a positive side in the Z direction can be referred to as an upper side and a negative side thereof can be referred to as a lower side.

Entire Configuration

The image forming apparatus 1 includes, as illustrated in FIGS. 1 and 2, an image forming unit 20 for forming an image, or toner image, on a recording material, a sheet feeding unit 30 for feeding a recording material P, a fixing unit 9 for fixing a toner image formed by the image forming unit 20 on the recording material, and a sheet discharge roller pair 10.

The image forming unit 20 includes a scanner unit 50, a process unit 40 adopting an electrophotographic system, and a transfer roller 7*a* for transferring a toner image formed on the photosensitive drum 11 of the process unit 40 to the recording material P The process unit 40 includes the photosensitive drum 11 serving as an image bearing member, and a cleaning unit 13, a charging roller 17, and a developing roller 12 serving as processing members arranged in a circumference of the photosensitive drum 11. Further, the process unit 40 includes a developer container 230 equipped with a storage portion 18 for storing toner and a replenishing unit 200 for replenishing toner to the storage portion 18.

The transfer roller 7*a* serving as a transfer member is arranged on a transfer unit 7 and is urged toward the photosensitive drum 11 by an urging member not shown.

The photosensitive drum 11 is a photosensitive member formed in a cylindrical shape. The photosensitive drum 11 according to the present embodiment has a photosensitive layer formed of a negative-charged organic photoconductor disposed on a drum-shaped base body made of aluminum. Further, the photosensitive drum 11 is driven to rotate at a predetermined processing speed in a predetermined direction, i.e., R direction in the drawing, by a motor.

The charging roller 17 contacts the photosensitive drum 11 with a predetermined pressure contact force to form a charging portion. Further, the surface of the photosensitive drum 11 is charged uniformly to a predetermined potential by having a desired charging voltage applied thereto from a charging high-voltage power supply. In the present embodiment, the photosensitive drum 11 is charged to negative polarity by the charging roller 17.

The scanner unit 50 scans and exposes the surface of the photosensitive drum 11 by irradiating the surface with laser light based on the image information entered from the external apparatus to the photosensitive drum 11 using a polygon mirror. By this exposure, an electrostatic latent image corresponding to the image information is formed on the surface of the photosensitive drum 11. Further, the scanner unit 50 is not limited to a laser scanner device, and for example, an LED exposing unit including an LED array in which a plurality of T FDs are arranged along the longitudinal direction of the photosensitive drum 11 can also be adopted.

The developing roller 12 is supported rotatably by the storage portion 18 including the frame body and the developer container serving as a toner storage portion. Further, the developing roller 12 is arranged in an opening portion of the developer container 230 including the storage portion 18 so as to oppose the photosensitive drum 11. Further, the storage portion 18 can be provided with a feed roller for applying toner serving as developer stored in the storage portion 18 to a surface of the developing roller 12.

The process unit 40 according to the present embodiment adopts a contact development system as the development system. In other words, a toner layer borne on the developing roller 12 contacts the photosensitive drum 11 at a developing portion, or developing area, where the photosensitive drum 11 and the developing roller 12 oppose one another. A developing voltage is applied to the developing roller 12 from a developing high-voltage power supply. By the toner borne on the developing roller 12 being transferred from the developing roller 12 to the drum surface according to a potential distribution on the surface of the photosensitive drum 11 under the developing voltage, the electrostatic latent image is developed into a toner image.

The toner according to the present embodiment is a so-called nonmagnetic one-component developer that does not contain magnetic components, wherein toner is borne on the developing roller 12 mainly by intermolecular force or electrostatic force, i.e., image force. However, it may also be possible to use a one-component developer containing a magnetic component. Further, in addition to toner particles, an additive such as wax and silica particulates for adjusting fluidity and charge property of toner can be contained in the one-component developer. Further, a two-component developer composed of nonmagnetic toner and magnetic carrier can be used as the developer. If a developer having a magnetic property is used, a cylindrical developing sleeve having a magnet arranged on an inner side thereof is used, for example, as the developer bearing member.

The fixing unit 9 adopts a heat fixing system in which fixing of image is performed by heating and melting the toner on the recording material. The fixing unit 9 includes a heating roller 9*a* including a fixing heater 9*c* and a pressure roller 9*b* which is in pressure contact with the heating roller 9*a*. The fixing unit 9 nips and conveys the recording material P by a fixing nip formed between the heating roller 9*a* serving as a first rotary member and the pressure roller 9*b* serving as a second rotary member while heating the toner on the recording material by the heating roller 9*a* to fix the image.

The fixing heater 9*c* is a heating unit for heating the toner on the recording material, and for example, a heater board having a heating resistor pattern formed on a heat-resistant substrate made of ceramic, for example, can be used. Further, a cylindrical, or endless, film member having flexibility can be used as the first rotary member. If a film member is used, a heater substrate and a holder for holding the heater substrate are arranged in an internal space of the film member. Thereby, the fixing unit 9 having a superior quick start property can be formed. Further, a halogen lamp that generates radiant heat or an induction heating mechanism that heats a conductive layer in the heating roller 9*a* or in the film member by electromagnetic induction can be used as the heating unit.

The sheet feeding unit 30 includes a cassette 4, i.e., recording material supporting portion, on which the recording material P is supported, and a pickup roller 3, a feed roller 5*a*, and a separation roller 5*b* that serve as a conveyance unit. An openable/closable front cover 70 is disposed at least at a portion of an end face at a front side of the image forming apparatus 1. When the image forming apparatus 1 is viewed from the front side with the front cover 70 closed, the front cover 70 covers a circuit board 100 described below.

A casing 72 of the image forming apparatus 1 includes the front cover 70, a sheet discharge tray 14, a rear cover 73 (refer to FIG. 4), and an exterior cover 71 that constitutes an exterior of the image forming apparatus 1 with the components mentioned above. A sheet discharge port 15 through which the sheet discharged onto the sheet discharge tray 14 passes is formed on the casing 72. The front cover 70 and the rear cover 73 are respectively provided in an openable/closable manner with respect to the other portions of the casing 72. Hereafter, the portion excluding the front cover 70 and the rear cover 73 from the casing 72 is referred to as a casing main body 72A.

As illustrated in FIG. 2, the image forming apparatus 1 includes the circuit board 100. The circuit board 100 includes a wiring board 101 made of an insulator, and electronic components 111 and 121 that are soldered onto the wiring board 101. The electronic components 111 and 121 are electrically connected since a conductor wiring is provided on the surface of and inside the wiring board 101. The circuit board 100 including the electronic components 111 and 121 has a function to convert an alternating current supplied from an exterior of the image forming apparatus 1 to a direct current, and to convert an input voltage for acquiring a predetermined voltage value required for the image forming process.

The circuit board 100 is arranged such that the surface of the wiring board 101 on which the electronic components 111 and 121 are mounted intersects a sheet discharging direction. Further, the wiring board 101 is disposed between the front cover 70 and the scanner unit 50 in the sheet discharging direction. The electronic components 111 and 121 are disposed on a surface of the wiring board 101 opposed to the scanner unit 50.

Next, an image forming operation of the image forming apparatus 1 will be described. When an image forming command is entered to the image forming apparatus 1, an image forming process by the image forming unit 20 is started based on the image information entered from an external computer connected to the image forming apparatus 1. The scanner unit 50 projects laser light to the photosensitive drum 11 based on the entered image information. The photosensitive drum 11 is charged in advance by the charging roller 17, and an electrostatic latent image is formed on the photosensitive drum 11 by the laser light being projected thereto. Thereafter, the electrostatic latent image is developed by the developing roller 12, and a toner image is formed on the photosensitive drum 11.

In parallel with the image forming process described above, the pickup roller 3 of the sheet feeding unit 30 sends out the recording material P supported on the cassette 4. The recording material P is separated one by one by the feed roller 5*a* and the separation roller 5*b* and conveyed to a conveyance roller pair 5*c*. The recording material P is conveyed by the conveyance roller pair 5*c*, or registration roller pair, serving as a conveyance unit toward a transfer nip N1 serving as an image forming unit formed by the transfer roller 7*a* and the photosensitive drum 11.

Transfer voltage is applied from a high-voltage power supply for transfer to the transfer roller 7*a*. Thereby, the toner image borne on the photosensitive drum 11 is transferred to the recording material P conveyed by the conveyance roller pair 5*c* at the transfer nip N1. The recording material P to which the toner image has been transferred is conveyed to the fixing unit 9, and the toner image is heated and pressed while the recording material P passes through the nip portion between the heating roller 9*a* and the pressure roller 9*b* of the fixing unit 9. Thereby, the toner particles are melted and thereafter solidified, by which the toner image is fixed to the recording material P The recording material P passed through the fixing unit 9 is discharged to an exterior of the image forming apparatus 1 from the sheet discharge port 15 by the sheet discharge roller pair 10, and supported on the sheet discharge tray 14.

As described, an image is formed on one side of the recording material P while being conveyed through a conveyance path 19, i.e., first conveyance path, from the conveyance roller pair 5*c* via the transfer nip N1 to the fixing unit 9.

When forming images on both sides of the recording material P, the sheet discharge roller pair 10 subjects the recording material P having an image formed on a first surface to switchback so as to guide the recording material P to a duplex conveyance path 16. The recording material P guided to the duplex conveyance path 16 is conveyed again toward the transfer roller 7*a* by a duplex conveyance roller pair 5*d*. After having an image formed on a second surface by the transfer roller 7*a*, the recording material P is discharged to the exterior by the sheet discharge roller pair 10.

Note that the image forming apparatus 1 according to the present embodiment is capable of forming images on both sides of the recording material P using the duplex conveyance path 16, but the present technique is not limited thereto. For example, it is possible to adopt a configuration without the duplex conveyance path 16, wherein the image forming apparatus 1 is only capable of forming an image on one side of the recording material P Further, the image forming unit 20 can form a color image using multiple toner colors. An example of the image forming unit 20 capable of forming color images includes four process units each equipped with a photosensitive drum 11 and forming a single-color toner image, and an intermediate transfer body that bears a color image by having single-color toner images transferred thereto from each of the photosensitive drums 11.

Control Circuit

Figure 3:
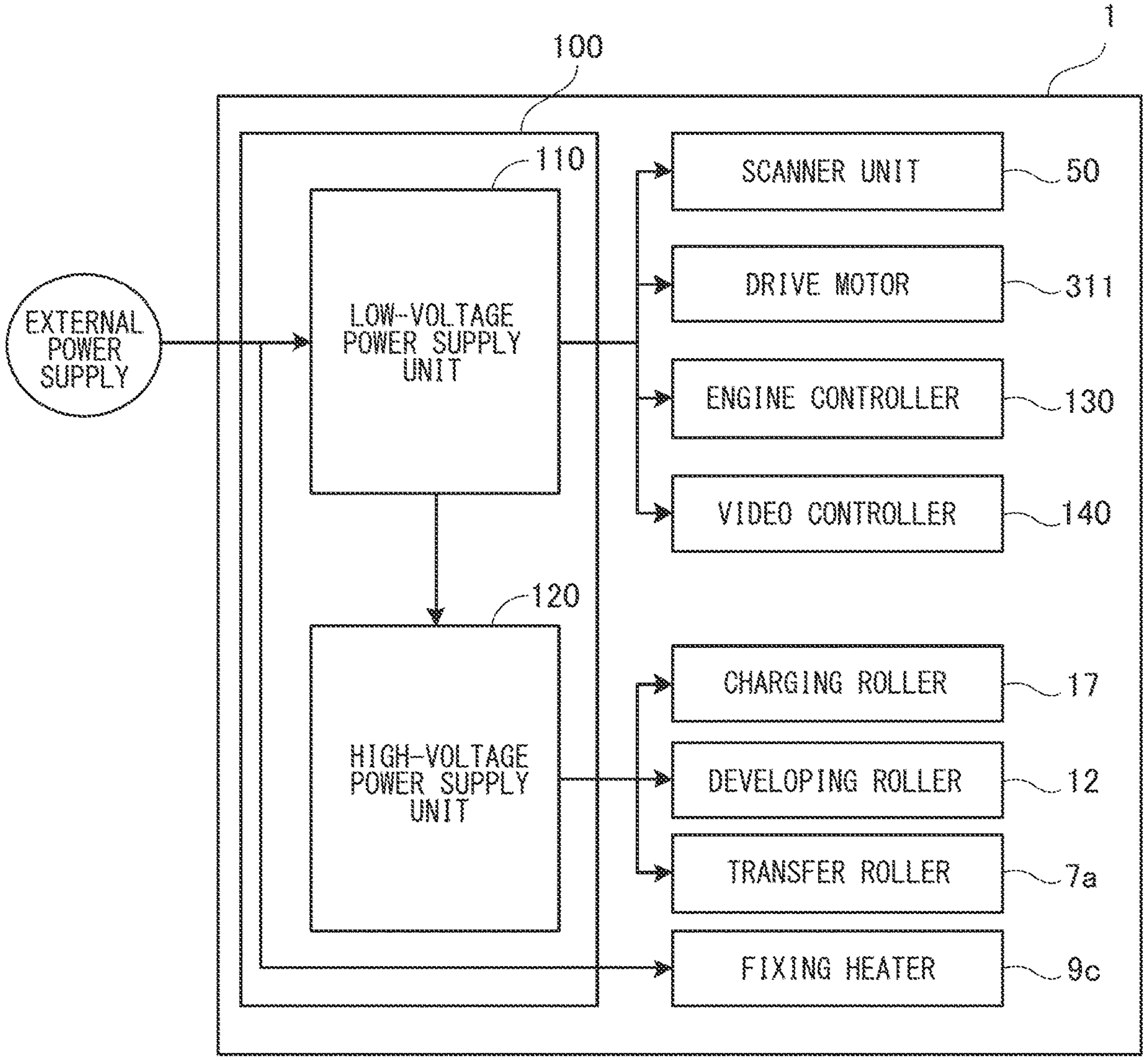
FIG. 3 is a block diagram illustrating a configuration of the image forming apparatus according to the first embodiment.

FIG. 3 is a block diagram illustrating functions of the circuit board 100 according to the present embodiment. The circuit board 100 includes a low-voltage power supply unit 110 and a high-voltage power supply unit 120.

The low-voltage power supply unit 110 receives electric power from an external power supply via a power supply input unit not shown mounted on an end portion of the substrate, and converts the alternating current (AC) voltage into a stable direct current (DC) voltage using a rectifying/smoothing circuit including an electrolytic capacitor. Further, the low-voltage power supply unit 110 converts the DC voltage into a high-frequency AC voltage by a switching element such as a transistor, and enters the high-frequency AC voltage to a low-voltage power transformer. The low-voltage power transformer converts the high-frequency AC voltage serving as the input voltage to an AC voltage having a desired voltage value, i.e., output voltage. The low-voltage power supply unit 110 converts the AC voltage to DC voltage again, and outputs the acquired DC voltage to the high-voltage power supply unit 120. Further, the loss of the individual circuit components appears as heat in the low-voltage power supply unit 110, such that a heat sink not shown made of aluminum or iron is provided to radiate heat.

The high-voltage power supply unit 120 converts the voltage of 24 V, for example, supplied from the low-voltage power supply unit 110 into a high voltage that is required for performing the image forming processes such as charging, developing, and transfer. The voltage supplied from the low-voltage power supply unit 110 is converted into a charging voltage by a charging transformer and supplied to the charging roller 17. The voltage supplied from the low-voltage power supply unit 110 is converted into a voltage for developing image by a developing transformer 123, and supplied to the developing roller 12. The voltage supplied from the low-voltage power supply unit 110 is converted into a voltage for transfer by a transformer for transferring image and supplied to the transfer roller 7*a*.

The low-voltage power supply unit 110 supplies voltage of 3.3 V or 5 V, for example, not only to the high-voltage power supply unit 120 but also to the scanner unit 50, a drive motor 311, an engine controller 130, and a video controller 140. The engine controller 130 serving as a control unit has a function to integrally control the various processing members. The engine controller 130 includes a central processing unit (CPU), a random access memory (RAM) used to compute data for controlling the image forming apparatus 1 or as a temporal storage, and a read-only memory (ROM) for storing programs and various data for controlling the image forming apparatus 1. The video controller 140 has a function to communicate with an external apparatus such as a personal computer, receive print data, and notify the analyzed result of the print data to the engine controller 130. The engine controller 130 and the video controller 140 can be provided on a board that differs from the circuit board 100, or can be mounted on the same board.

Further, the AC power from a commercial power supply received by the power supply input unit is supplied not only to the low-voltage power supply unit 110 but also to the fixing heater 9*c*. The driving of the pressure roller 9*b* by the fixing unit 9 is performed by the drive motor 311. The heating roller 9*a*, or a film member in place of the heating roller 9*a*, can be configured to rotate along with the pressure roller 9*b* by the force received from the pressure roller 9*b*.

The image forming apparatus 1 can be configured to drive a plurality of objects to be driven by one drive motor 311. In this case, it may be preferable to adopt a configuration in which the transmission of drive between the drive motor 311 and some of the objects to be driven can disconnected, or released as necessary. The objects to be driven by the drive motor 311 of the present embodiment can include the pickup roller 3, the feed roller 5*a*, the conveyance roller pair 5*c*, the transfer roller 7*a*, the photosensitive drum 11, the heating roller 9*a*, the pressure roller 9*b*, the sheet discharge roller pair 10, and the duplex conveyance roller pair 5*d*. That is, according to the image forming apparatus 1 of the present embodiment, the driving force of a plurality of conveyance members that contact the recording material P and rotate thereby so as to convey the recording material P can be provided by the drive motor 311 that serves as a common drive source.

Configuration of Rear Cover and Transfer Unit

Figure 4:
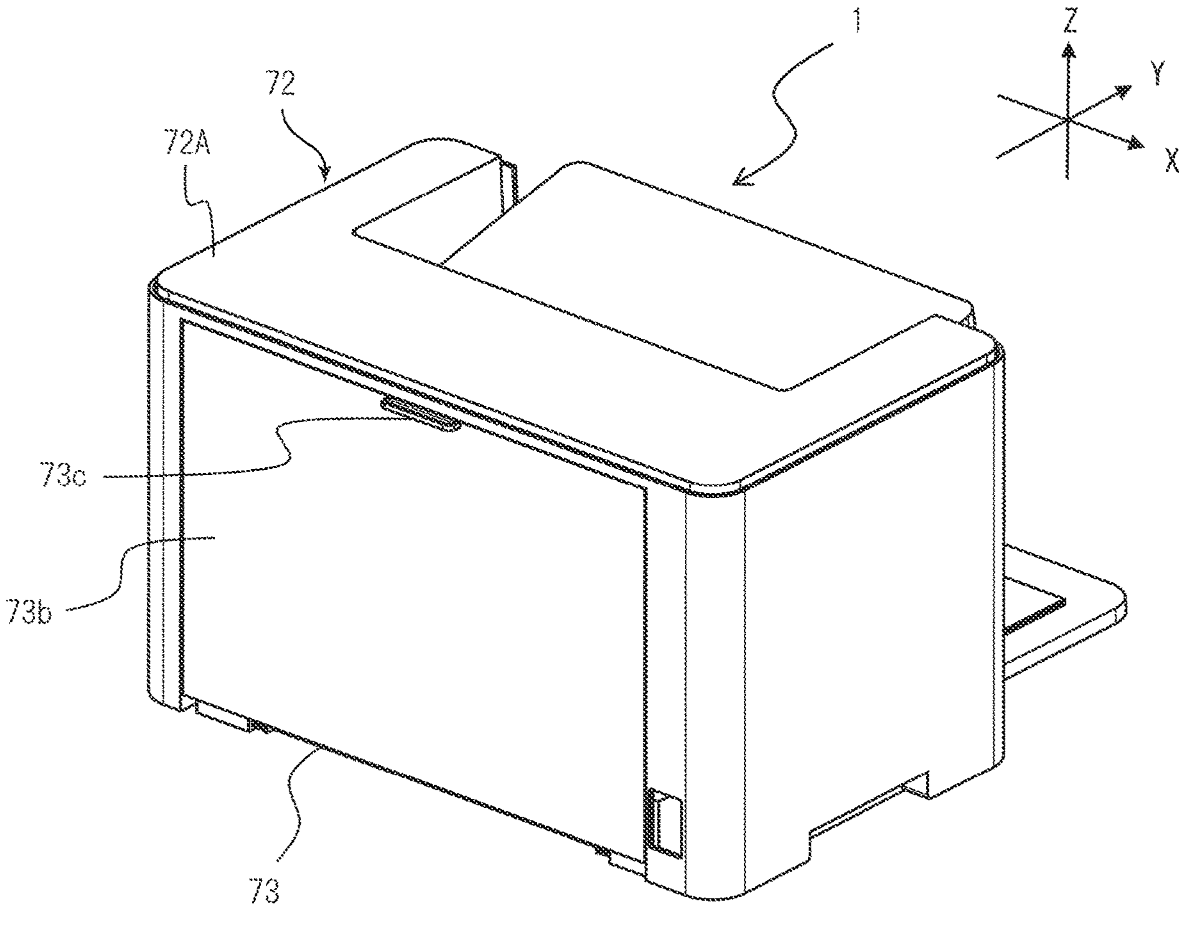
FIG. 4 is a perspective view of the image forming apparatus according to the first embodiment with a rear cover closed.
Figure 5:
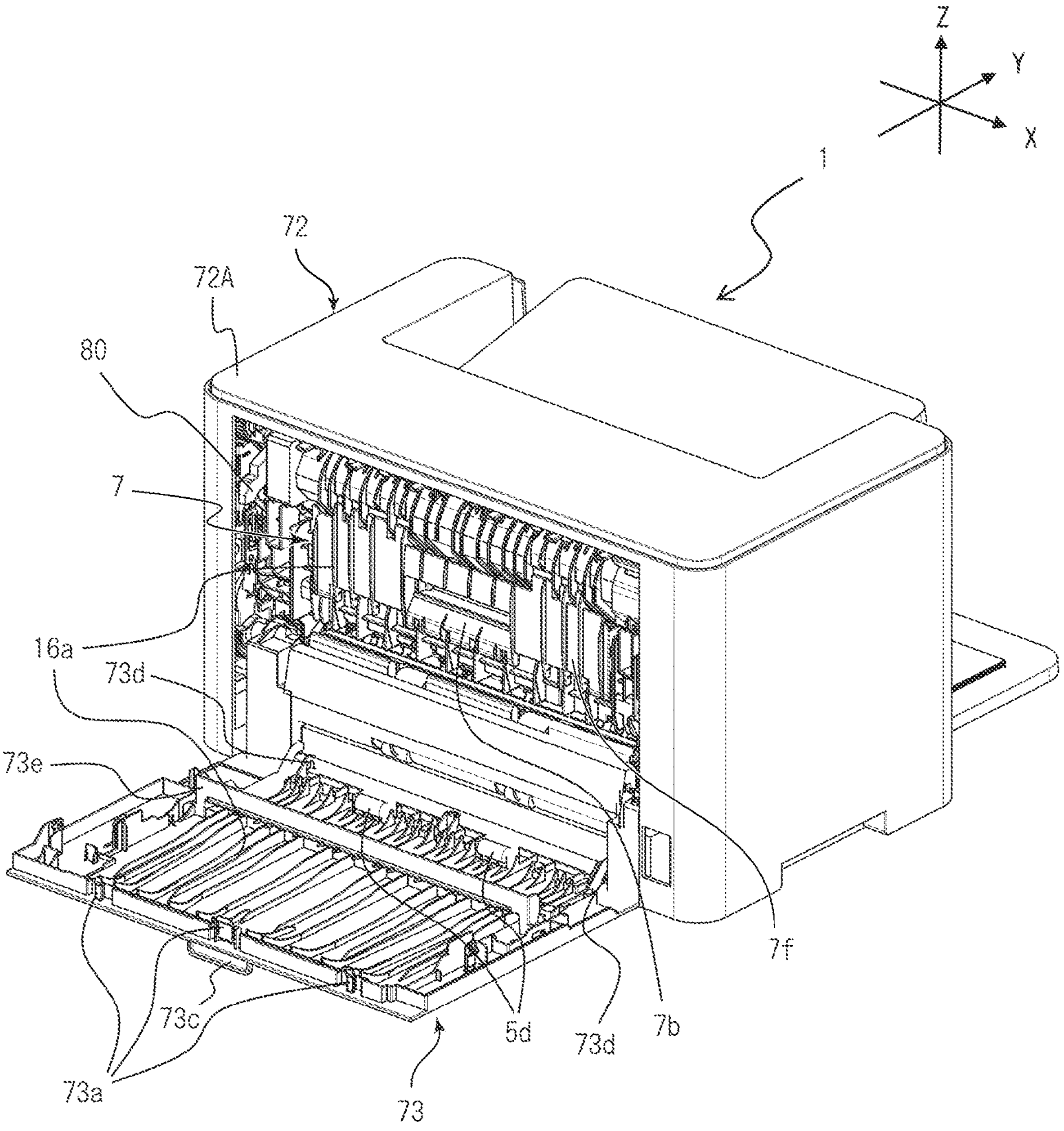
FIG. 5 is a perspective view of the image forming apparatus according to the first embodiment with the rear cover opened.
Figure 6:
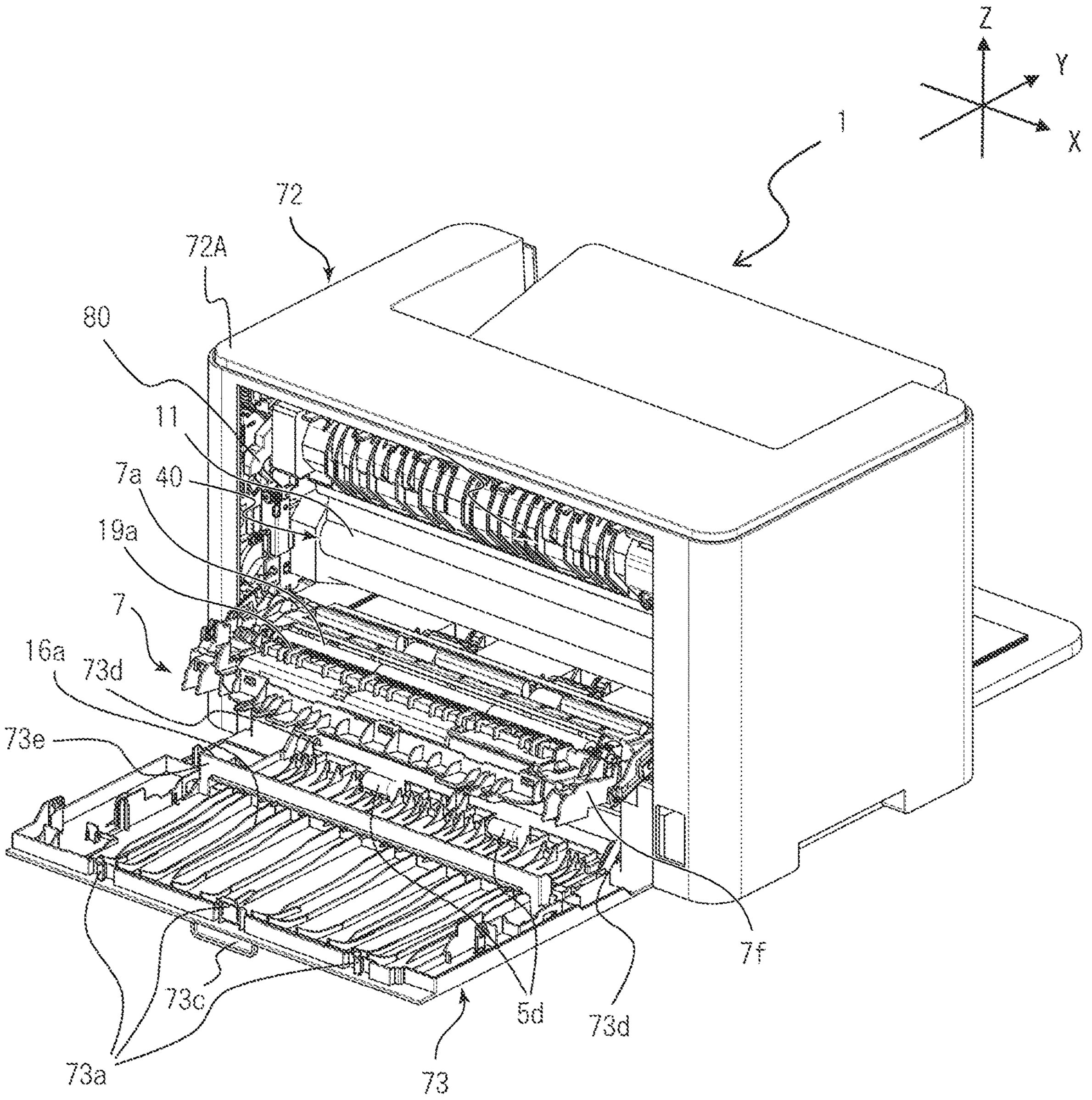
FIG. 6 is a perspective view of the image forming apparatus according to the first embodiment with a transfer unit opened.
Figure 7:
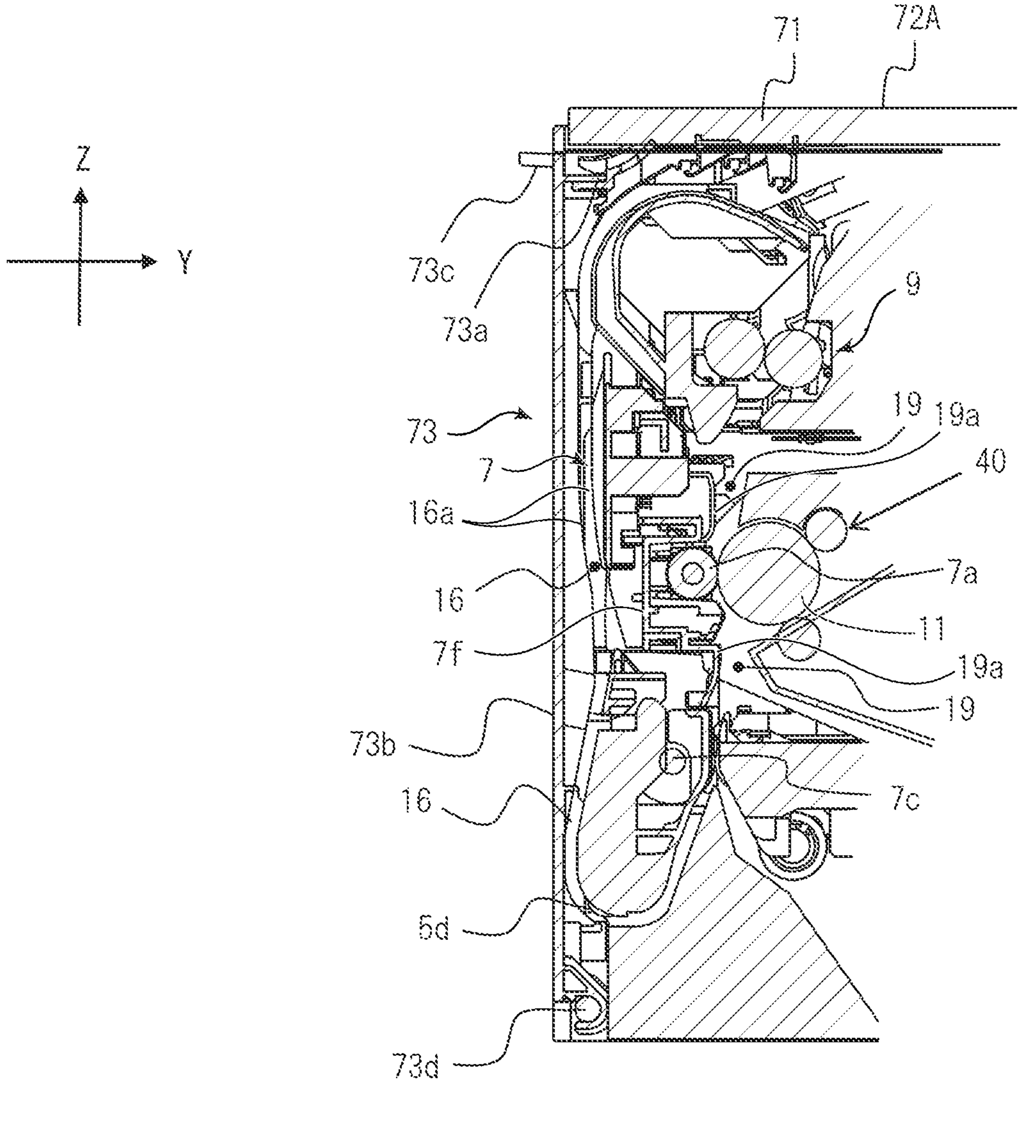
FIG. 7 is a cross-sectional view of the image forming apparatus according to the first embodiment with the rear cover closed.
Figure 8:
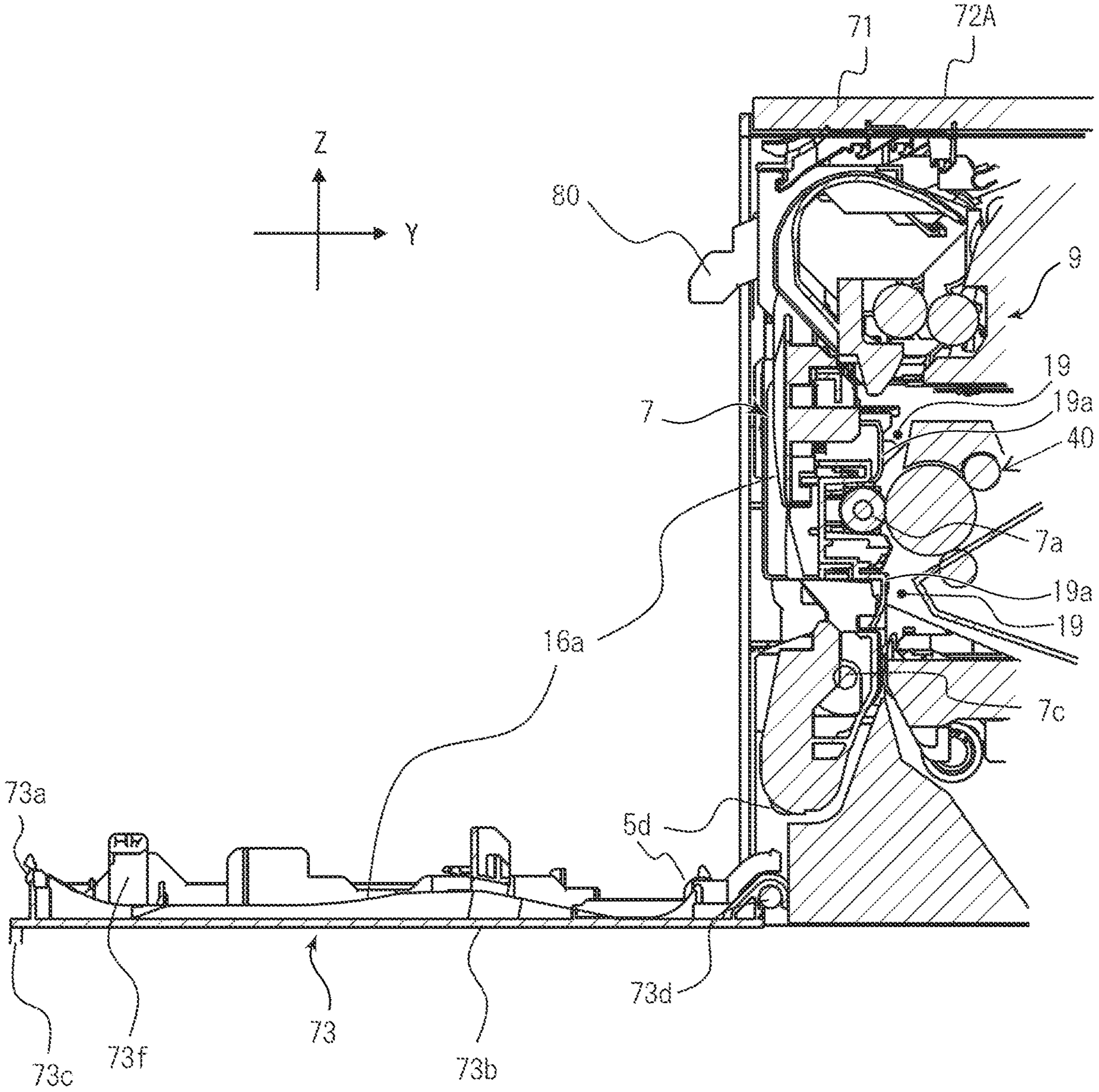
FIG. 8 is a cross-sectional view of the image forming apparatus according to the first embodiment with the rear cover opened.
Figure 9:
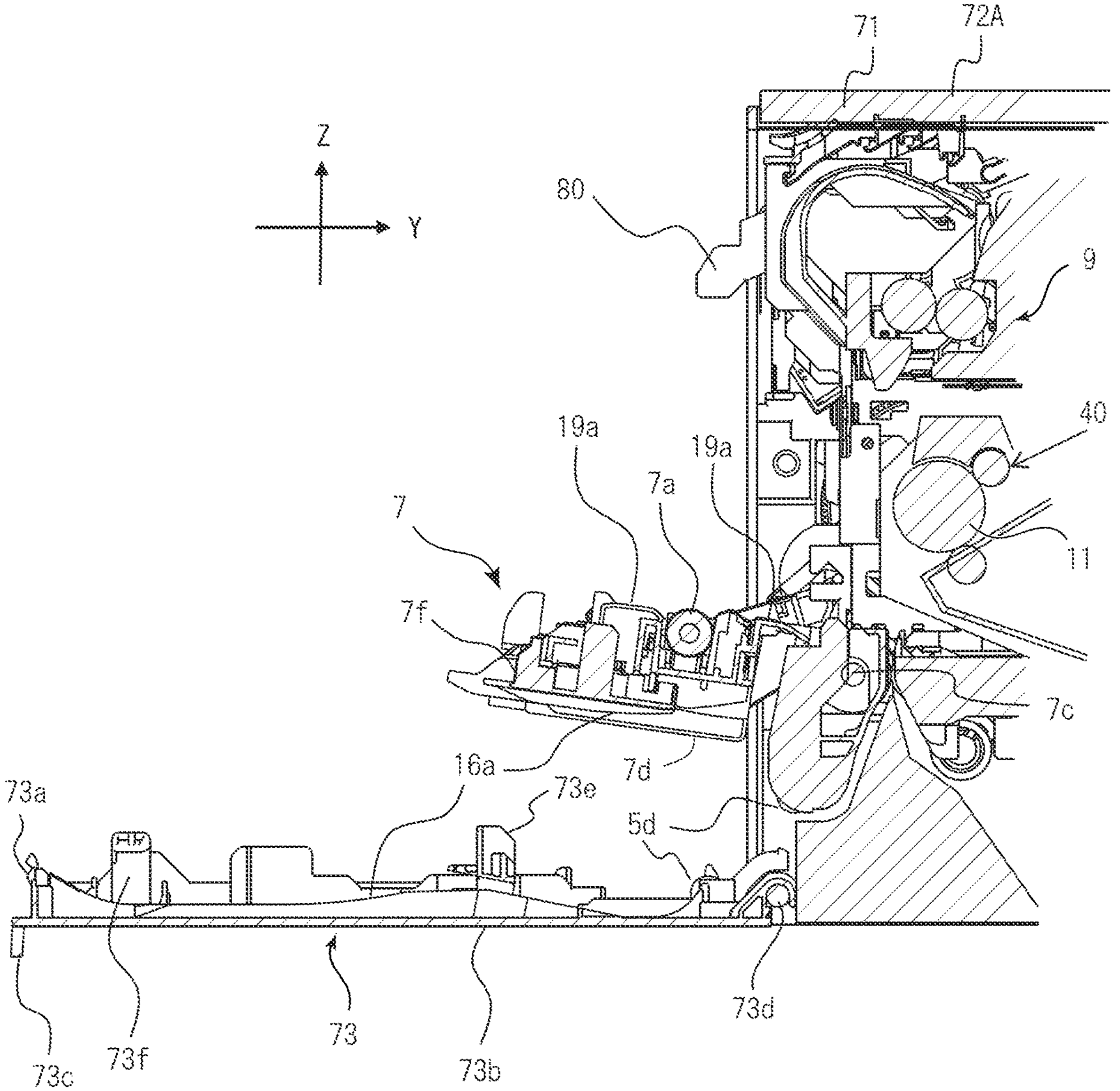
FIG. 9 is a cross-sectional view of the image forming apparatus according to the first embodiment with the transfer unit opened.
Figure 10:
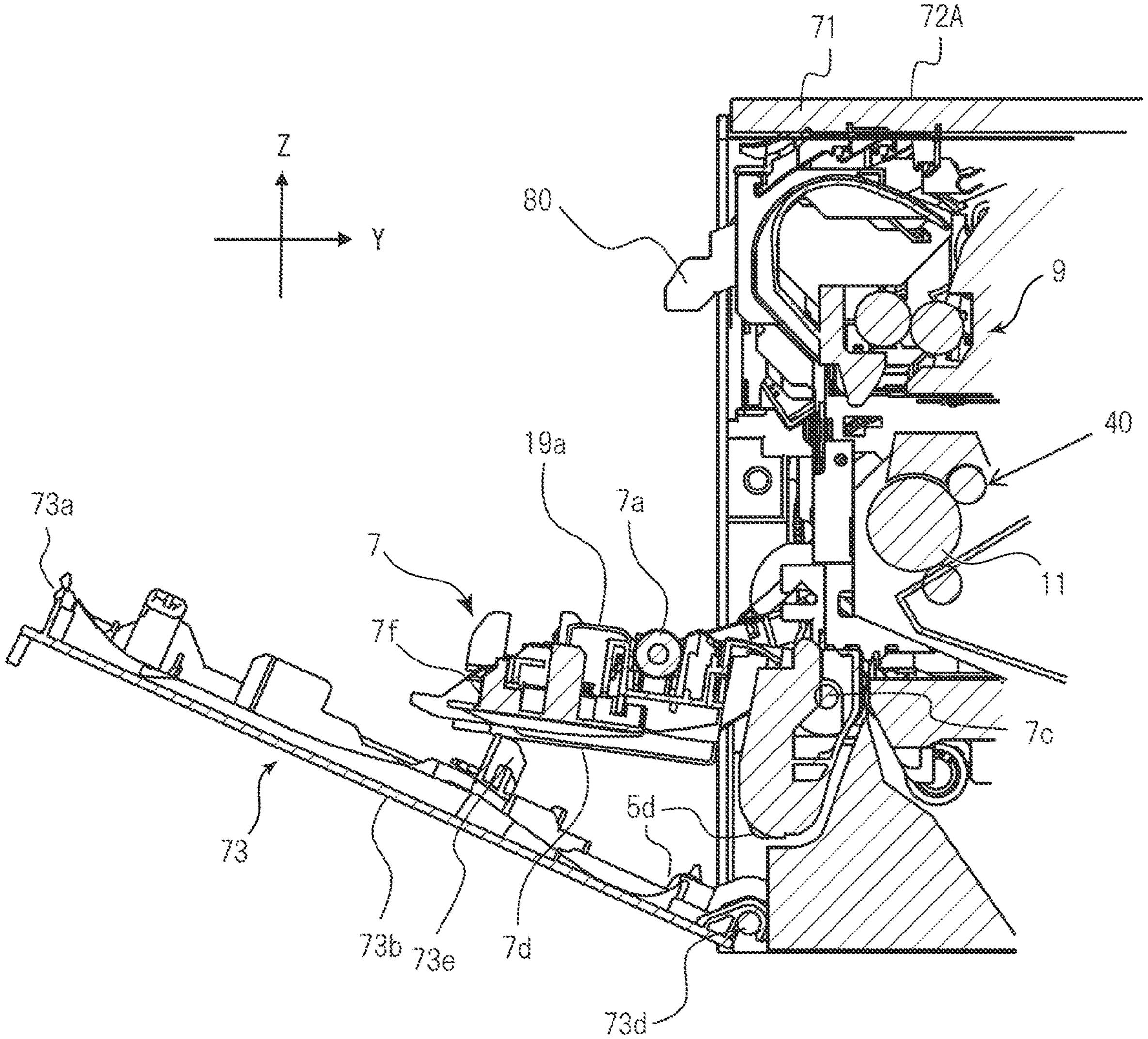
FIG. 10 is a cross-sectional view of the image forming apparatus according to the first embodiment with the rear cover in midway of being closed.

An opening/closing operation of the rear cover 73 and the transfer unit 7 will be described with reference to FIGS. 4 to 10. FIGS. 4 to 6 are each a perspective view in which the image forming apparatus 1 is viewed from the rear side, and FIGS. 7 to 10 are each a cross-sectional view in which a Y-Z cross-section that passes the conveyance path of the recording material within the image forming apparatus 1 is viewed from one side, i.e., right side, in the X direction. FIGS. 4 and 7 show a state in which the rear cover 73 and the transfer unit 7 are closed, FIGS. 5 and 8 show a state in which only the rear cover 73 is opened, and FIGS. 6 and 9 illustrate a state in which both the rear cover 73 and the transfer unit 7 are opened. FIG. 10 illustrates a state in which the rear cover 73 in midway of being closed from the state in which both the rear cover 73 and the transfer unit 7 are opened.

As illustrated in FIGS. 4 to 9, the rear cover 73 includes engagement claws 73*a*, an outer surface 73*b*, a support shaft 73*d*, and a pressing rib 73*e*.

The rear cover 73 is supported pivotably via the support shaft 73*d* on the casing main body 72A. The rear cover 73 serves as an opening/closing member, or pivot member, capable of being opened and closed between a closed position, or closed state, illustrated in FIGS. 4 and 7, and an opened position, or opened state, illustrated in FIGS. 5, 6, and 8 to 10. A pivot axis, i.e., center line of the support shaft 73*d*, of the rear cover 73 according to the present embodiment is provided on a lower edge portion of the rear cover 73 in the closed state and extends approximately in the X direction.

The outer surface 73*b* is an exterior portion that constitutes at least a portion of an end face of a rear side of the casing 72 when the rear cover 73 is in the closed state. That is, the outer surface 73*b* is exposed when the image forming apparatus 1 is viewed from the rear side when the rear cover 73 is in the closed state. According to the present embodiment, when the rear cover 73 is in the closed state (FIG. 7), the outer surface 73*b* is oriented to extend approximately in the vertical direction (i.e., gravity direction) when viewed in the X direction, and when the rear cover 73 is in the opened state (FIG. 8), the outer surface 73*b* is oriented to extend in the approximately horizontal direction.

In the following description, an exterior side of the rear cover 73 refers to a rear side, that is, negative side in the Y direction, of the rear cover 73 in the closed state, and an interior side of the rear cover 73 refers to a front side, that is, positive side in the Y direction, of the rear cover 73 in the closed state.

A grip portion 73*c* is provided on an upper edge portion of the outer surface 73*b* in the closed state of the rear cover 73 to protrude to the front side of the rear cover 73 from the outer surface 73*b*. The grip portion 73*c* is an operating portion that the operator, that is, user, or service provider, operates when opening and closing the rear cover 73.

The engagement claws 73*a* are provided on the interior side of the rear cover 73 (refer for example to FIG. 5). The engagement claws 73*a* are protruded to the front side, i.e., positive side in the Y direction, from the upper edge portion of the rear cover 73 in a state where the rear cover 73 is closed. The engagement claws 73*a* each function as a locking member capable of locking the rear cover 73 in the closed position to the casing main body 72A.

The pressing rib 73*e* is provided on the interior side of the rear cover 73. The pressing rib 73*e* functions as a pressing portion that presses the transfer unit 7 when closing the rear cover 73, as described below.

As illustrated in FIGS. 5 to 9, the transfer unit 7 includes the transfer roller 7*a*, a grip portion 7*b*, a support shaft 7*c*, a pressed portion 7*d*, and a transfer frame 7*f*.

The transfer roller 7*a* has both end portions in the rotational axis direction supported rotatably by the transfer frame 7*f* The transfer frame 7*f* is a frame body of the transfer unit 7. The transfer frame 7*f* is supported pivotably via the support shaft 7*c* by portions of the casing 72 other than the rear cover 73, that is, the apparatus body. The transfer unit 7 is an opening/closing member, or pivot member, that can be opened and closed between a closed position, or closed state, illustrated in FIGS. 5, 7, and 8, and an opened position, or opened state, illustrated in FIGS. 6 and 9.

The grip portion 7*b* is a recessed shape that is provided on a guide surface 7*g* of the transfer frame 7*f* The guide surface 7*g* is a surface of the transfer frame 7*f* opposed to the rear cover 73 with the duplex conveyance path 16 interposed therebetween. The grip portion 7*b* is an operating portion that is operated by the operator when opening and closing the transfer unit 7.

The pressed portion 7*d* is a portion that is pressed by the pressing rib 73*e* of the rear cover 73. The pressed portion 7*d* is a front side surface of the transfer frame 7*f*, that is, the surface on the rear side, or negative side in the Y direction, when the transfer unit 7 is closed.

As illustrated in FIGS. 4 and 7, when the rear cover 73 is in the closed state, the rear cover 73 covers the transfer unit 7 and the process unit 40 when viewed from the rear side of the image forming apparatus 1. In this state, the engagement claws 73*a* of the rear cover 73 each engage with an engaged portion provided on the exterior cover 71 on the top surface of the casing 72, by which the rear cover 73 is locked at the closed position. Further, when the rear cover 73 is closed, the transfer unit 7 is also maintained in the closed position.

When the rear cover 73 is positioned at the closed position, the duplex conveyance path 16 (FIGS. 2 and 7) is formed by sheet passing ribs 16*a* (FIG. 5) formed on each of the interior side surface of the rear cover 73 and the front side surface of the transfer frame 7*f* Further, when the transfer unit 7 is positioned at the closed position, the conveyance path 19 (FIGS. 2 and 7) is formed between sheet passing ribs 19*a* (FIGS. 6 and 9) provided on the back side surface of the transfer frame 7*f* and a main body guide opposed to the sheet passing ribs 19*a*.

When both the rear cover 73 and the transfer unit 7 are closed, the image forming apparatus 1 can execute the image forming operation. That is, the closed position of the rear cover 73 and the transfer unit 7 is a position in which the image forming apparatus 1 can execute the image forming operation.

When the operator holds the grip portion 73*c* of the rear cover 73 in the closed state and pulls the same toward the rear side of the image forming apparatus 1, as illustrated in FIGS. 5 and 8, the rear cover 73 is opened, that is, the rear cover 73 is moved from the closed position to the opened position. When the rear cover 73 is opened, at least a portion of the duplex conveyance path 16 (FIGS. 2 and 7) is opened. That is, the opened position of the rear cover 73 is a position in which the sheet passing ribs 16*a* serving as the guide portion of the duplex conveyance path 16 are exposed to the exterior of the image forming apparatus 1. At a point of time when the rear cover 73 is opened, the transfer unit 7 is maintained at the closed position by a link member not shown, and the process unit 40 is not exposed.

In a state where the rear cover 73 is opened, if the operator holds the grip portion 7*b* of the transfer unit 7 and pulls the same further toward the rear side of the image forming apparatus 1, as illustrated in FIGS. 6 and 9, the transfer unit 7 is opened, that is, the transfer unit 7 is moved from the closed position to the opened position. When the transfer unit 7 is opened, at least a portion of the conveyance path 19 (FIGS. 2 and 7) is opened and at least a portion of the process unit 40 is exposed when viewed from the rear side of the image forming apparatus 1.

Jam Removal Operation

Next, a method for removing the recording material P, that is, jammed sheet, from the inner side of the image forming apparatus 1 when sheet jamming of the recording material P occurs during the image forming operation will be described. When sheet jamming occurs, at first, the user opens the rear cover 73 to enable the duplex conveyance path 16 to be accessed, as illustrated in FIGS. 5 and 8. Thereby, the user can remove the jammed sheet that is jammed in the duplex conveyance path 16. As mentioned below, according to the present embodiment, a transmission path from the drive motor 311 (FIG. 3) to the pressure roller 9*b* is disconnected, or freed, in accordance with the operation of opening the rear cover 73, such that the pressure roller 9*b* can be rotated freely by a relatively small force when the rear cover 73 is in the opened state.

If the jamming has occurred in the vicinity of the transfer nip N1, as illustrated in FIGS. 6 and 9, the transfer unit 7 is further opened from the opened state of the rear cover 73 to enable the conveyance path 19 to be accessed. Thereby, the user can remove the jammed sheet that is jammed in the conveyance path 19.

As described, according to the present embodiment, when jamming occurs, the user can perform the operation of removing the jammed sheet, i.e., jam removal, by accessing the conveyance path (16 or 19) within the apparatus from the rear side of the image forming apparatus 1 without removing the process unit 40.

After jam removal, the user closes the transfer unit 7 and the rear cover 73 to allow the image forming apparatus 1 to prepare for execution of an image forming operation again. According to the present embodiment, the transfer unit 7 in the opened state is configured to be closed in accordance with the operation of closing the rear cover 73. That is, as illustrated in FIG. 10, when the rear cover 73 is pivoted for approximately 25 degrees from the opened position toward the closed position, the pressing rib 73*e* of the rear cover 73 abuts against the pressed portion 7*d* of the transfer unit 7. Thereafter, by having the pressing rib 73*e* press the pressed portion 7*d*, the transfer unit 7 pivots in the clockwise direction in the drawing in accordance with the rear cover 73 and the transfer unit 7 moves to the closed position before the rear cover 73 reaches the closed position. It is also possible for the user to close the transfer unit 7 before closing the rear cover 73.

When jamming occurs in a state where a part of the jammed sheet is exposed to the exterior of the sheet discharge port 15, the user can perform jam removal by pulling out the jammed sheet without opening the rear cover 73.

Drive Release Mechanism of Pressure Roller

Figure 11:
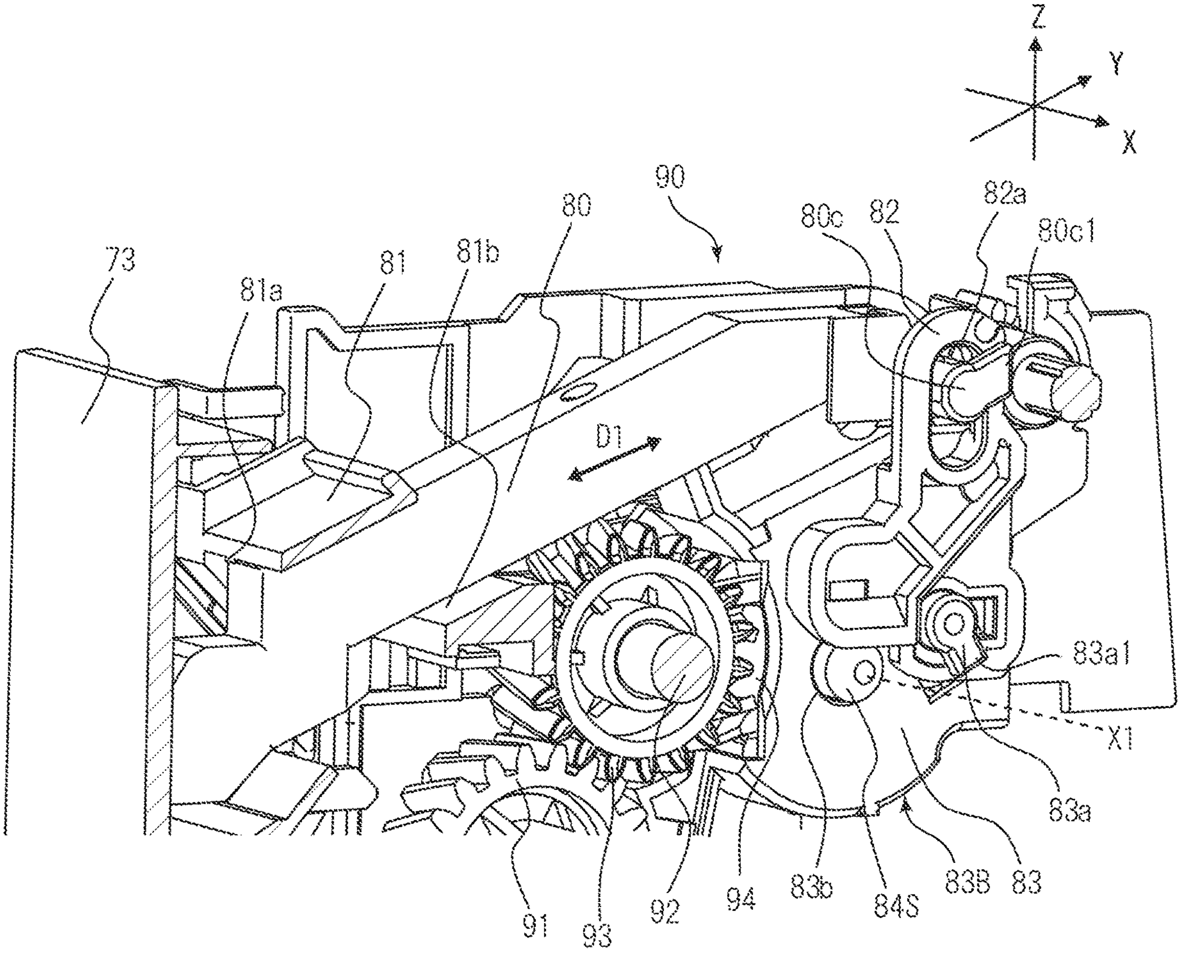
FIG. 11 is a perspective view of a drive release mechanism according to the first embodiment.
Figure 12:
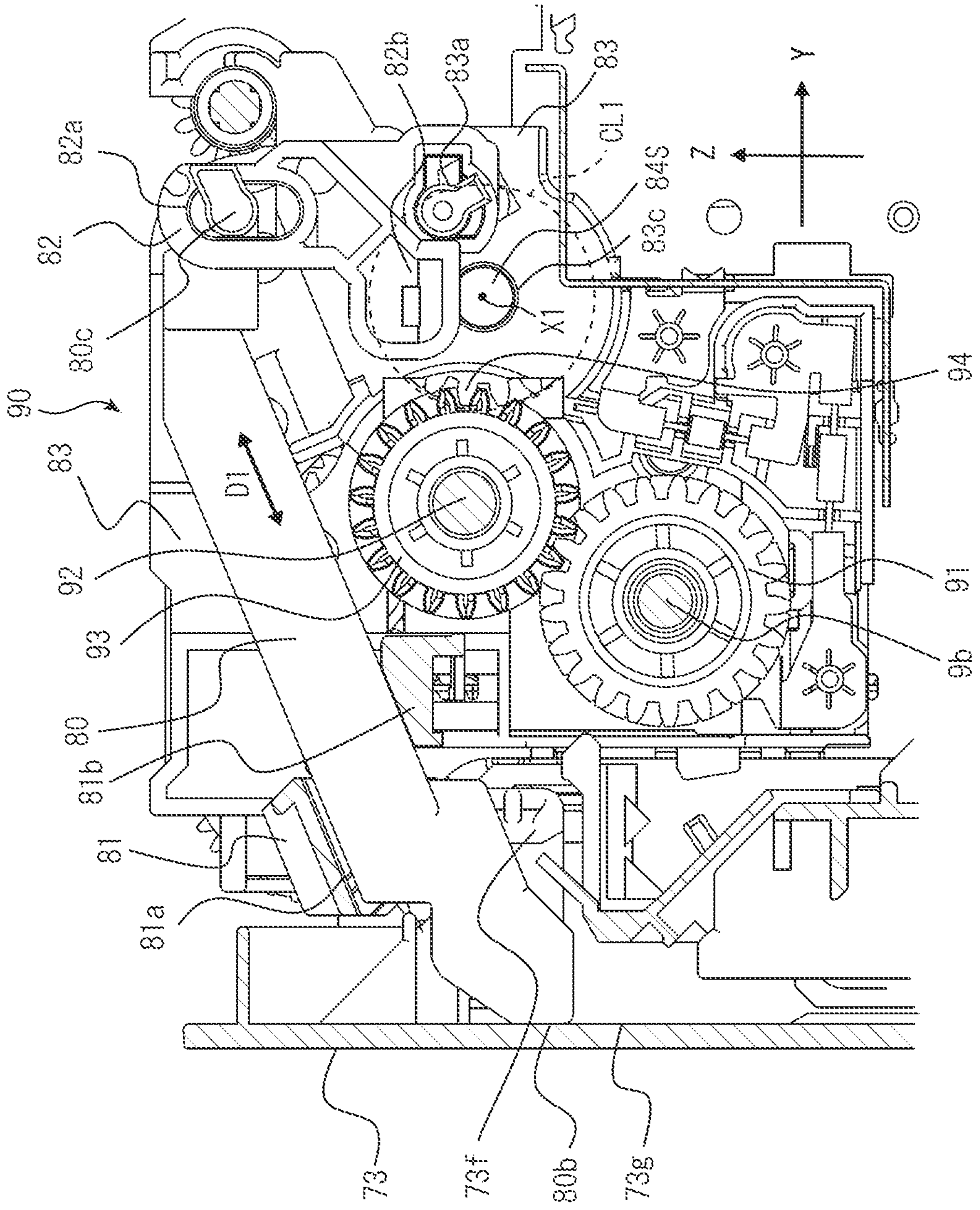
FIG. 12 is a side view of the drive release mechanism according to the first embodiment.
Figure 13:
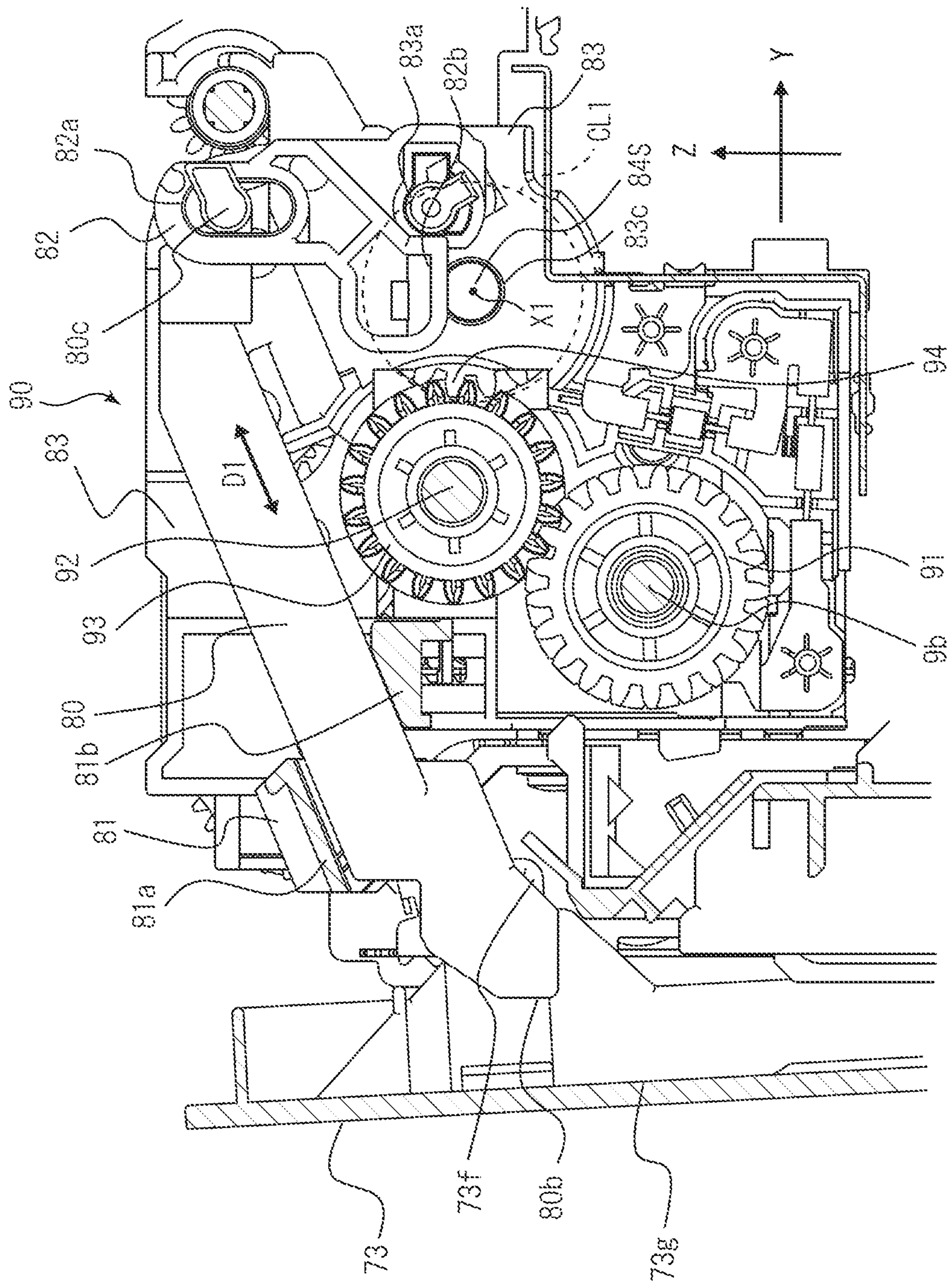
FIG. 13 is a side view of the drive release mechanism according to the first embodiment.
Figure 14:
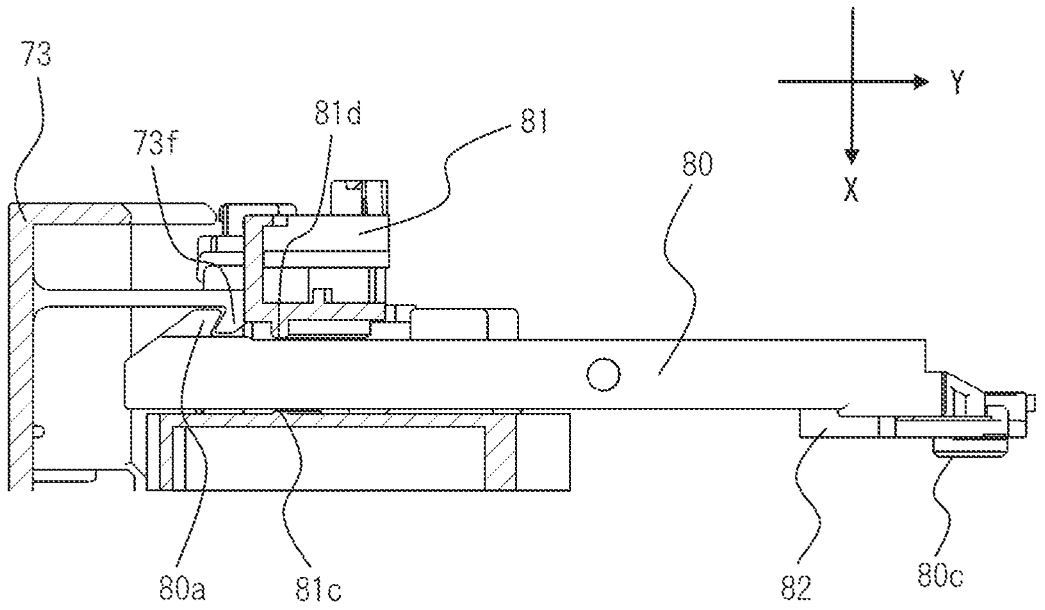
FIG. 14 is an upper view of the drive release mechanism according to the first embodiment.

With reference to FIGS. 11 to 17, a path of drive transmission from the drive motor 311 (FIG. 3) to the pressure roller 9*b* (FIG. 2) of the fixing unit 9 and a drive release mechanism 90 for releasing the drive transmission to the pressure roller 9*b* will be described. FIG. 11 is a perspective view of the drive release mechanism 90. FIGS. 12, 13, and 15 to 17 are each a cross-sectional view of the image forming apparatus 1 in which the drive release mechanism 90 and a vicinity thereof are viewed from the positive side in the X direction. FIG. 14 is a cross-sectional view of the image forming apparatus 1 in which a release lever 80 and a vicinity thereof are viewed from above.

At first, the drive transmission path from the drive motor 311 to the pressure roller 9*b* is described. As illustrated in FIG. 12, the pressure roller 9*b* is connected to the drive motor 311 via a pressure roller gear 91, an idler gear 93, and a clutch portion CL1.

The pressure roller gear 91 is attached to an end portion in the X direction of a roller shaft of the pressure roller 9*b* and rotates integrally with the pressure roller 9*b*. The pressure roller gear 91 is meshed with the idler gear 93. The idler gear 93 is retained rotatably by an idler shaft 92 fixed to a frame not shown that constitutes a part of the casing 72. Further, the idler gear 93 is meshed with a driven gear 94 of the clutch portion CL1.

The clutch portion CL1 receives input of driving force from the drive motor 311 via a gear train not shown and outputs a driving force for the pressure roller 9*b* from the driven gear 94 serving as an output member. The clutch portion CL1 is configured switchable between a connected state, or state of drive transmission, for transmitting the driving force between the drive motor 311 and the pressure roller 9*b* and a released state, or freed state or disconnected state, in which the transmission of driving force is freed, or disconnected. The details of the clutch portion CL1 will be described below.

The clutch portion CL1 includes a shaft portion 84S serving as an actuated portion that is moved to switch the clutch portion CL1 from the connected state to the released state. The clutch portion CL1 is configured to be switched from the connected state to the released state when the shaft portion 84S is pressed by a release link 82 described below and moved thereby. The details of the clutch portion CL1 will be described below.

As illustrated in FIGS. 11 and 14, the drive release mechanism 90 includes the release lever 80, the release link 82, and the clutch portion CL1. The release lever 80 and the release link 82 are each a movable member, i.e., interconnected member, that is moved with respect to the casing 72 in accordance with the opening and closing of the rear cover 73. The release lever 80 and the release link 82 constitute an interconnecting mechanism of the present embodiment that applies a force for switching the clutch portion CL1 from the connected state to the released state in accordance with the opening and closing of the rear cover 73 to the shaft portion 84S of a release ratchet 84 described below.

As illustrated in FIGS. 11, 12, and 14, the release lever 80 is retained movably, or in a slidable manner, along a predetermined movement direction by a guide 81. The guide 81 is fixed to the casing main body 72A. The guide 81 includes an upper guide portion 81*a* for guiding an upper surface of the release lever 80, and a lower guide portion 81*b* for guiding a lower surface of the release lever 80 (FIGS. 11 and 12). Further, the guide 81 includes a right guide portion 81*c* for guiding a right side surface of the release lever 80 and a left guide portion 81*d* for guiding a left side surface of the release lever 80 (FIG. 14).

A position of the release lever 80 in the up-down direction and a change of position, or rotation, of the release lever 80 when viewed in the X direction is regulated by the upper guide portion 81*a* and the lower guide portion 81*b*. Further, the position of the release lever 80 in the X direction is regulated by the right guide portion 81*c* and the left guide portion 81*d*. The release lever 80 slides along a movement direction D1 that intersects, or is preferably orthogonal to, the X direction by being guided by the upper guide portion 81*a*, the lower guide portion 81*b*, the right guide portion 81*c*, and the left guide portion 81*d*.

The release lever 80 is a member that is extended in an elongated manner along its own movement direction D1. As illustrated in FIGS. 12 and 14, a lever-side claw portion 80*a*, i.e., second engagement portion, that engages with a cover-side claw portion 73*f*, i.e., second engaged portion, of the rear cover 73 is provided at a first end portion in the longitudinal direction, i.e., movement direction D1, of the release lever 80. An end face 80*b* in the longitudinal direction of the release lever 80 is an abutted surface that is abutted against an inner side surface 73g, i.e., contact portion, of the rear cover 73. A boss 80*c*, i.e., engagement portion, that fits to a long hole 82*a*, i.e., engaged portion, provided on the release link 82 is provided at a second end portion in the longitudinal direction of the release lever 80. The release lever 80 and the release link 82 are connected such that the release link 82 is moved in accordance with the opening and closing of the rear cover 73 when the boss 80*c* engages with the long hole 82*a*. The boss 80*c* is a cylindrical projection that protrudes in the X direction. A plate-shaped restricting portion 80*c*1, i.e., retainer portion (FIG. 11), that restricts the boss 80*c* from falling from the long hole 82*a* is provided at the tip of the boss 80*c*.

As illustrated in FIGS. 11 and 12, the release link 82 includes the long hole 82*a* described above and a pressing portion 82*b*, i.e., actuating portion, that presses the shaft portion 84S, i.e., actuated portion, of the clutch portion CL1. The pressing portion 82*b* functions as an actuating portion that acts on the release link 82 serving as an intermediate member. The release link 82 is supported by a boss 83*a* of a gear box 83B and is capable of pivoting around an axis extending in the X direction. The gear box 83B is a frame body that accommodates the clutch portion CL1 described below and is fixed to the casing main body 72A. A plate-shaped restricting portion 83*a*1, i.e., retainer portion (FIG. 11), that restricts falling of the release link 82 is provided at the tip of the boss 83*a*.

Operation of Drive Release Mechanism

An operation of the drive release mechanism 90 when opening the rear cover 73 will be described with reference to FIGS. 11 to 17.

When the rear cover 73 is in the closed state as illustrated in FIGS. 11 and 12, the release lever 80 is in contact at its end face 80*b* with the inner side surface 73*g* of the rear cover 73. In this state, the cover-side claw portion 73*f* of the rear cover 73 is not engaged with the lever-side claw portion 80*a* of the release lever 80. Therefore, at a point of time when the rear cover 73 starts to pivot from the closed position toward the opened position, the release lever 80 is not moved in connection with the rear cover 73. Further, the pressing portion 82*b*, i.e., actuating portion, of the release link 82 is positioned at a position, i.e., third position, spaced apart from the shaft portion 84S of the clutch portion CL1.

As illustrated in FIGS. 13 and 14, when the rear cover 73 is pivoted for approximately three degrees from the closed position toward the opened position around the support shaft 73*d*, the cover-side claw portion 73*f* of the rear cover 73 engages with the lever-side claw portion 80*a* of the release lever 80. Thereby, the release lever 80 is moved to a rear side, or negative side in the Y direction, of the image forming apparatus 1 in the movement direction D1 in accordance with the rear cover 73.

Figure 15:
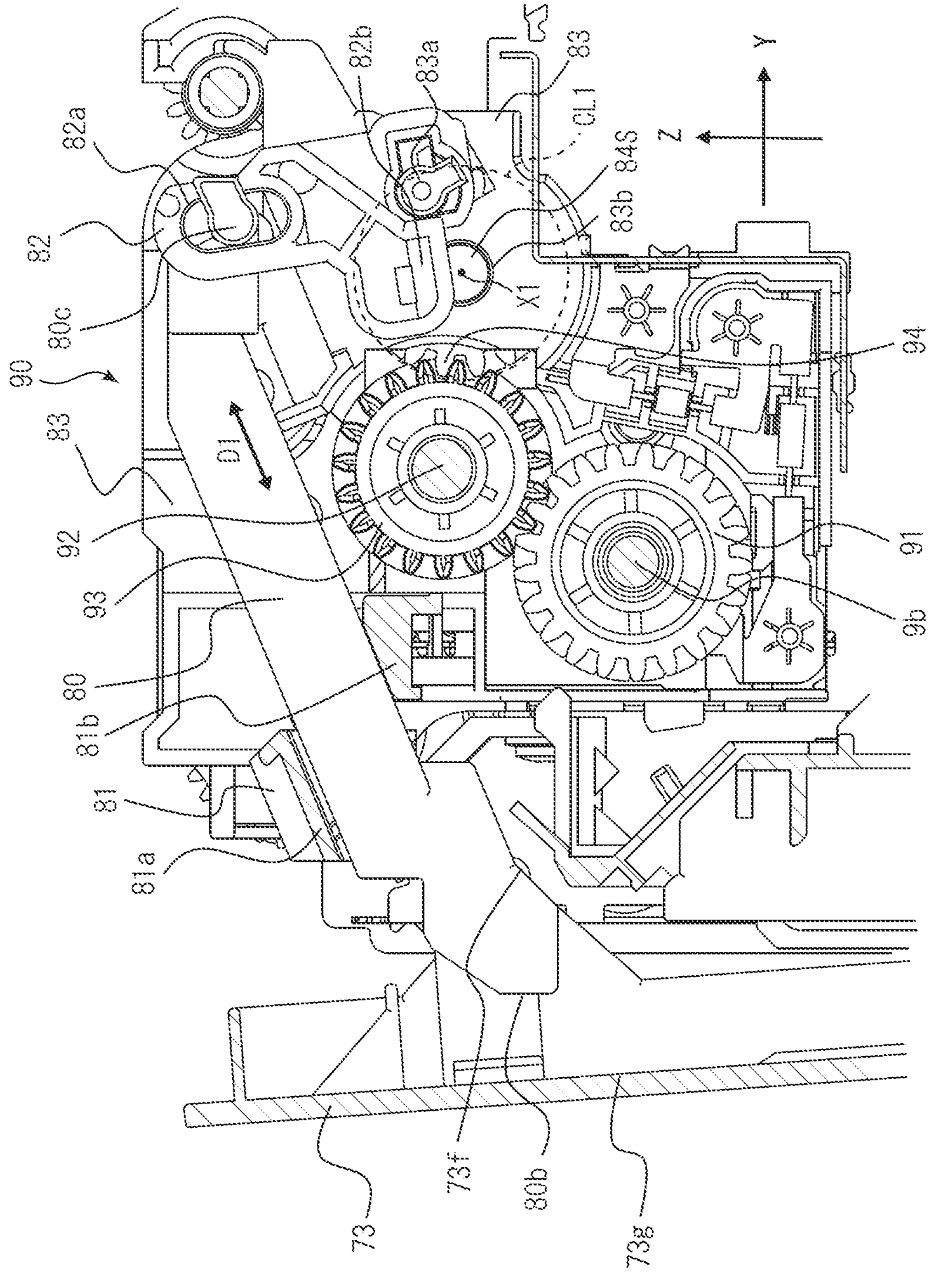
FIG. 15 is a side view of the drive release mechanism according to the first embodiment.

FIG. 15 illustrates a state in which the rear cover 73 is pivoted for approximately four degrees from the closed position toward the opened position. Compared to FIG. 13, it can be recognized that the release link 82 connected with the release lever 80 has also started to pivot in a counterclockwise direction in the drawing around the boss 83*a* in accordance with the rear cover 73 by the release lever 80 moving in accordance with the rear cover 73.

As described below, by the release link 82 pivoting in accordance with the rear cover 73, the pressing portion 82*b* of the release link 82 presses the shaft portion 84S of the clutch portion CL1.

Figure 16:
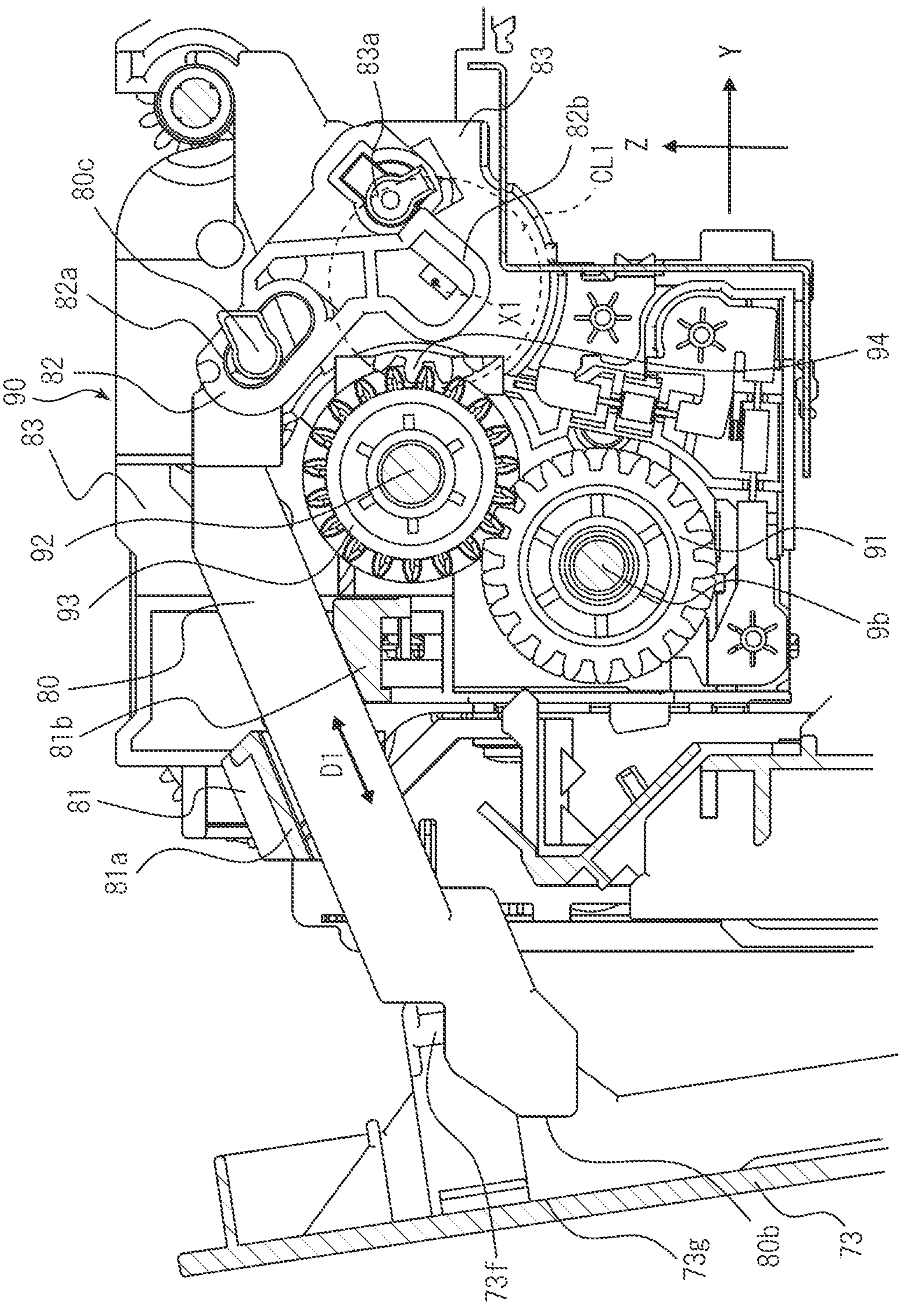
FIG. 16 is a side view of the drive release mechanism according to the first embodiment.

FIG. 16 illustrates a state in which the rear cover 73 is pivoted for approximately nine degrees from the closed position toward the opened position. Compared to FIG. 15, the release lever 80 is moved further toward the rear side of the image forming apparatus 1, and the release link 82 is further pivoted in the counterclockwise direction in the drawing.

The release lever 80 moves linearly along the movement direction D1 that is inclined downward toward the rear side, or negative side in the Y direction, of the image forming apparatus 1, whereas the cover-side claw portion 73*f* moves along a circular arc around the support shaft 73*d*. Therefore, during the process of opening the rear cover 73, the cover-side claw portion 73*f* moves relatively downward with respect to the lever-side claw portion 80*a*, and at a point of time when the rear cover 73 pivots for approximately nine degrees from the closed position, the cover-side claw portion 73*f* is separated from the lever-side claw portion 80*a*. Thereby, even if the rear cover 73 is pivoted further toward the opened position, the release lever 80 is retained at the position illustrated in FIG. 16. Further, the release link 82 is configured to complete the switching from the connected state to the released state of the clutch portion CL1 while the rear cover 73 pivots for nine degrees from the closed position. That is, in the state illustrated in FIG. 16, the pressing portion 82*b* of the release link 82 contacts the shaft portion 84S of the clutch portion CL1 and is positioned at the position, i.e., fourth position, in which the clutch portion CL1 is retained in the released state.

If the rear cover 73 is pivoted further from the state of FIG. 16 and the rear cover 73 is pivoted for approximately 90 degrees from the closed position as illustrated in FIGS. 5 and 8, the rear cover 73 will be in a completely opened state. In this state, the user can access the duplex conveyance path 16 exposed to the exterior of the image forming apparatus 1 and remove the jammed sheet retained in the duplex conveyance path 16. Further, if the transfer unit 7 is further opened in the state where the rear cover 73 is opened, as illustrated in FIGS. 6 and 9, the user can access the conveyance path 19 exposed to the exterior of the image forming apparatus 1 and remove the jammed sheet retained in the conveyance path 19. That is, by opening the transfer unit 7, the user can pull out the jammed sheet from the nip portion between the heating roller 9*a* and the pressure roller 9*b* of the fixing unit 9.

According to the present embodiment, in accordance with the operation for opening the rear cover 73, the clutch portion CL1 is switched from the connected state to the released state by the drive release mechanism 90. Therefore, when the rear cover 73 is in the opened state, drive transmission elements including the drive motor 311 which are positioned upstream of the clutch portion CL1 are disconnected from the pressure roller 9*b*. Therefore, when pulling out the jammed sheet from the nip portion between the heating roller 9*a* and the pressure roller 9*b* of the fixing unit 9, the pressure roller 9*b* can be rotated freely without receiving load from drive transmission elements upstream of the clutch portion CL1.

Supposing a case where the drive release mechanism 90 is not provided, when the jammed sheet is pulled out, the pressure roller 9*b* is rotated against the load of drive transmission elements upstream of the clutch portion CL1, such that a greater force is required for jam removal, and the jammed sheet may be torn. In contrast, according to the present embodiment, the pressure roller 9*b* can be rotated freely by smaller force, such that jam removal can be realized easily and the usability is improved.

As mentioned above, while the rear cover 73 is moved from the closed position to a predetermined position (FIG. 16) between the closed position and the opened position, the release lever 80, i.e., movable member, moves in a state where the cover-side claw portion 73*f*, i.e., second engagement portion, is engaged with the lever-side claw portion 80*a*, i.e., second engaged portion. Then, while the rear cover 73 is moved to the predetermined position, switching of the clutch portion CL1 from the connected state to the released state, that is, movement of the release ratchet 84 described below from a first position to a second position, is completed. Meanwhile, when the rear cover 73 moves from the predetermined position to the opened position (FIG. 17), the engagement of the cover-side claw portion 73*f*, i.e., second engagement portion, and the lever-side claw portion 80*a*, i.e., second engaged portion, is released, and the release lever 80, i.e., movable member, will not move.

As described, since the range in which the release lever 80, or movable member, is moved in accordance with the rear cover 73, or opening/closing member, is regulated, the size or movement locus of the release lever 80 is reduced compared to a case where the release lever 80 is moved throughout the entire movement range of the rear cover 73. As a result, further downsizing of the image forming apparatus 1 is enabled.

Next, the operation of the drive release mechanism 90 when closing the rear cover 73 from the opened state will be described.

Figure 17:
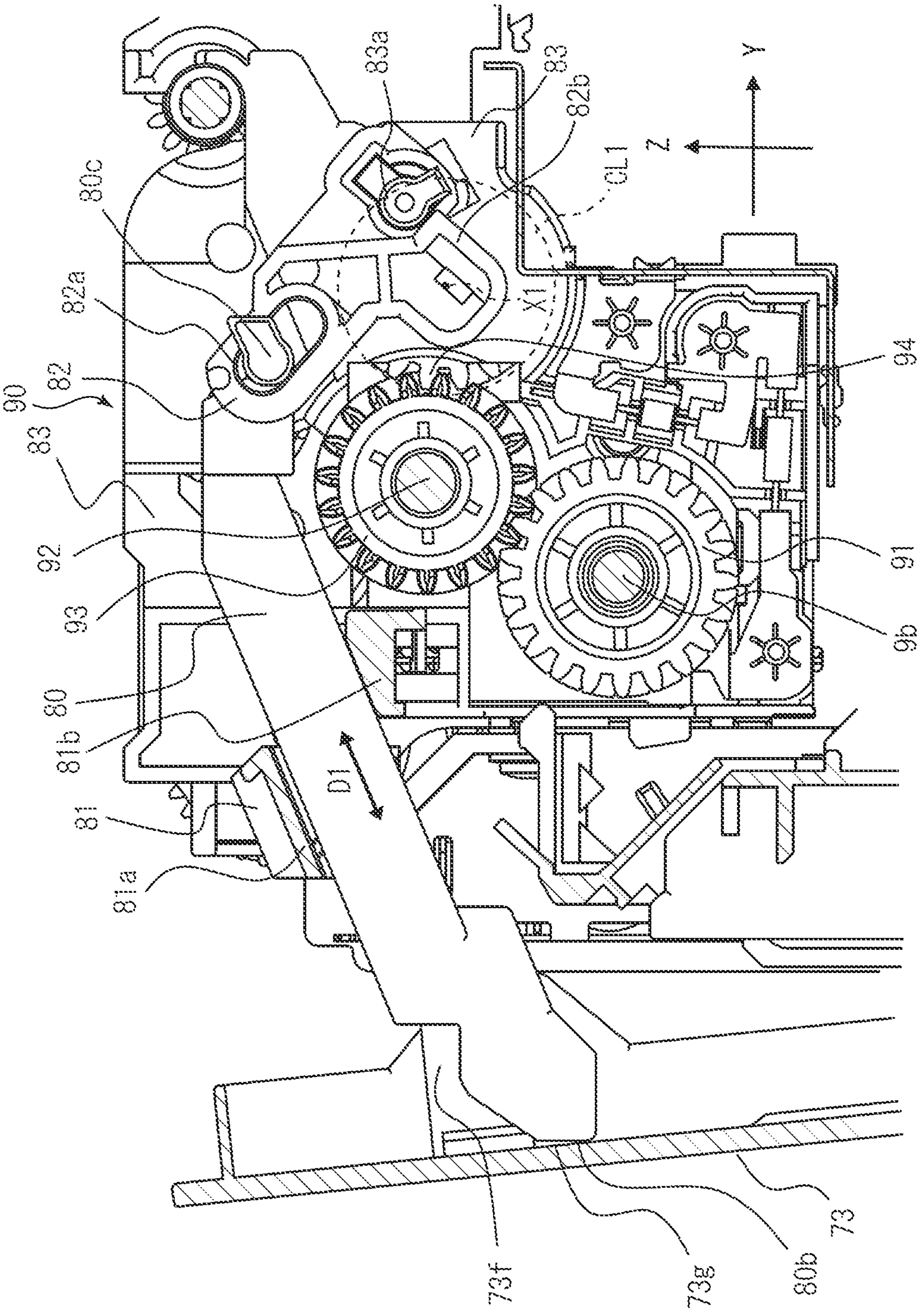
FIG. 17 is a side view of the drive release mechanism according to the first embodiment.

FIG. 17 illustrates a state at a point of time when the rear cover 73 in the opened state is pivoted to a position approximately six degrees from the closed position. When the rear cover 73 reaches the above-mentioned position, the inner side surface 73*g* of the rear cover 73 contacts the end face 80*b* of the release lever 80 again. If the rear cover 73 is closed further from this state, the inner side surface 73*g* presses the end face 80*b*, and the release lever 80 moves along the guide 81 in accordance with the rear cover 73. In this state, the release lever 80 moves to the front side of the image forming apparatus 1 in the movement direction D1. During the process of closing the rear cover 73, the release lever 80 and the release link 82 move the rear cover 73 to the position corresponding to the closed state illustrated in FIG. 12 via each of the positions of FIG. 15 and FIG. 14.

As described above, during the process of closing the rear cover 73, the pressing portion 82*b* of the release link 82 moves from the position pressing the shaft portion 84S of the clutch portion CL1, i.e., position of FIG. 17, or fourth position, to the position where it does not press the shaft portion 84S, i.e., position of FIG. 12, or third position. Accompanying this operation, the clutch portion CL1 is switched from the released state to the connected state.

Clutch Portion

Figure 18:
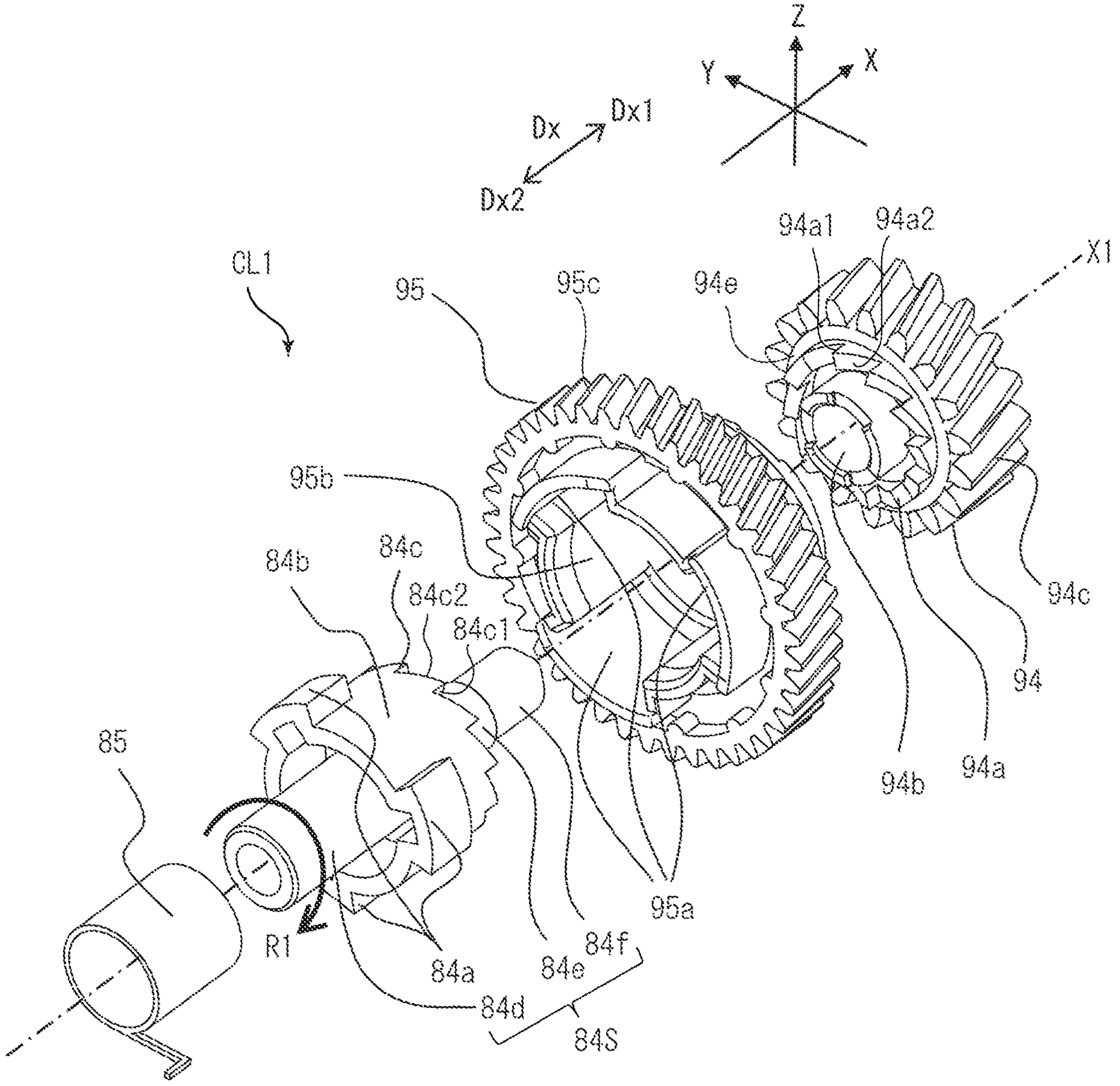
FIG. 18 is an exploded view of a clutch portion according to the first embodiment.
Figure 19:
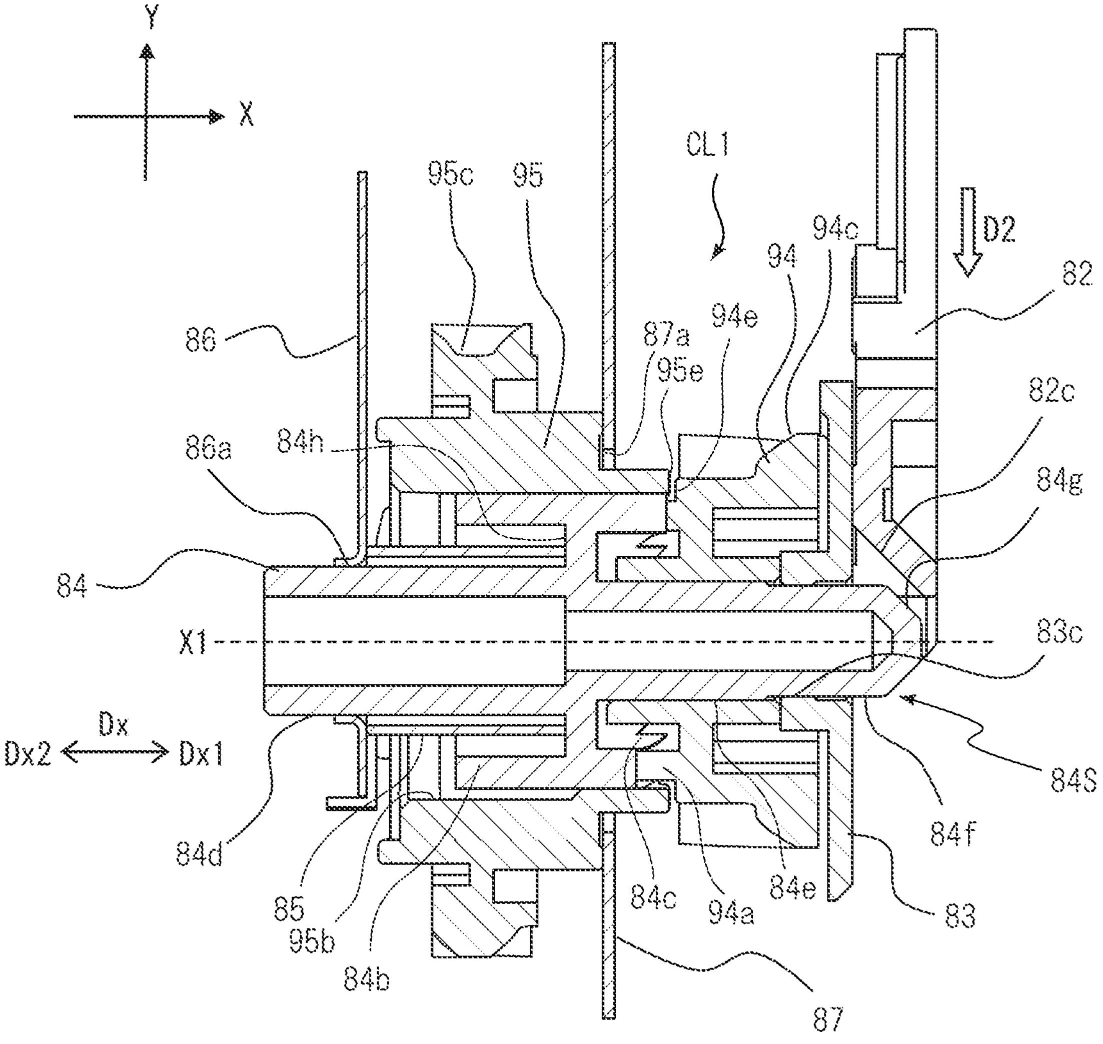
FIG. 19 is a cross-sectional view of the clutch portion according to the first embodiment.
Figure 20:
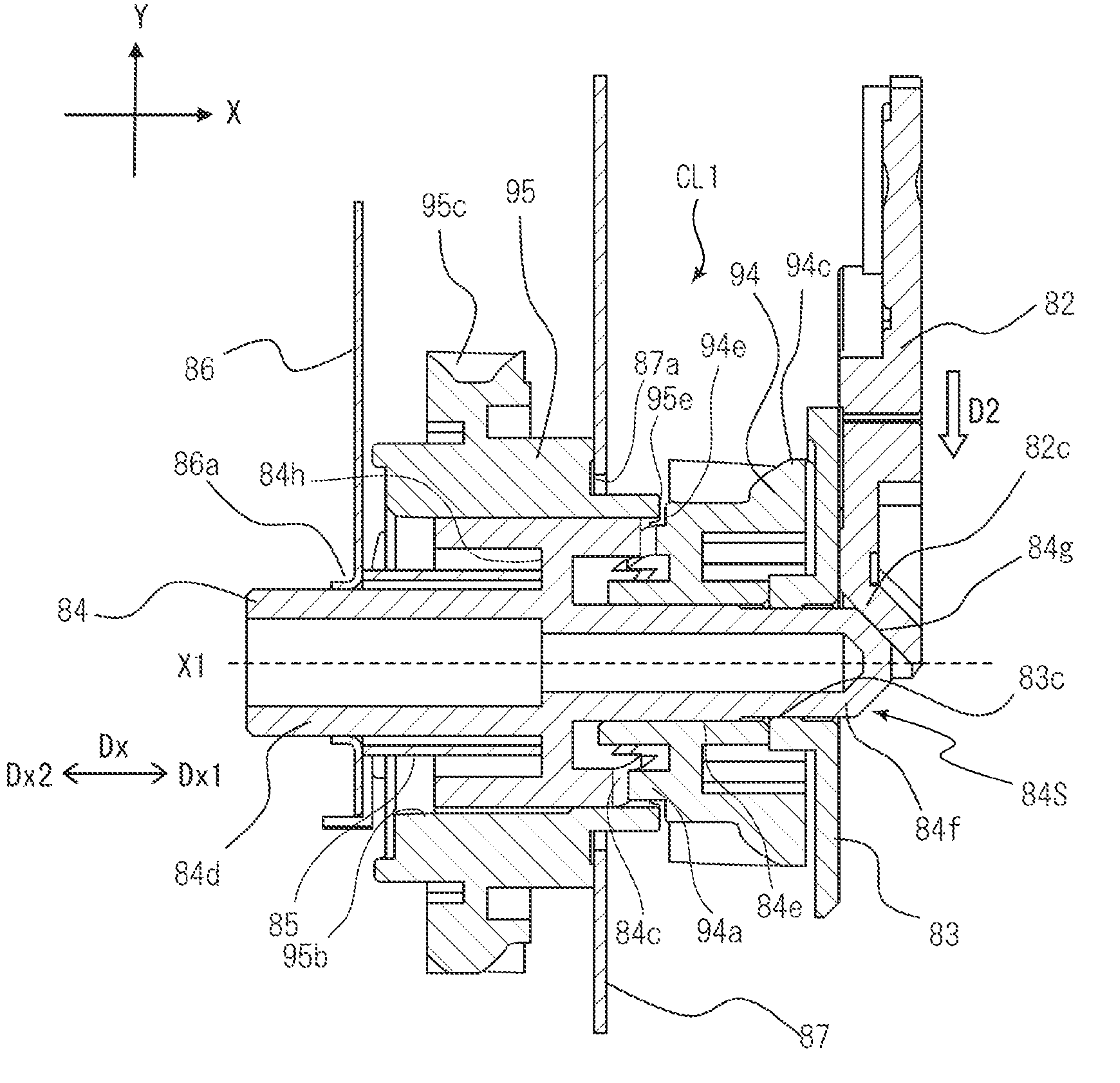
FIG. 20 is a cross-sectional view of the clutch portion according to the first embodiment.
Figure 21:
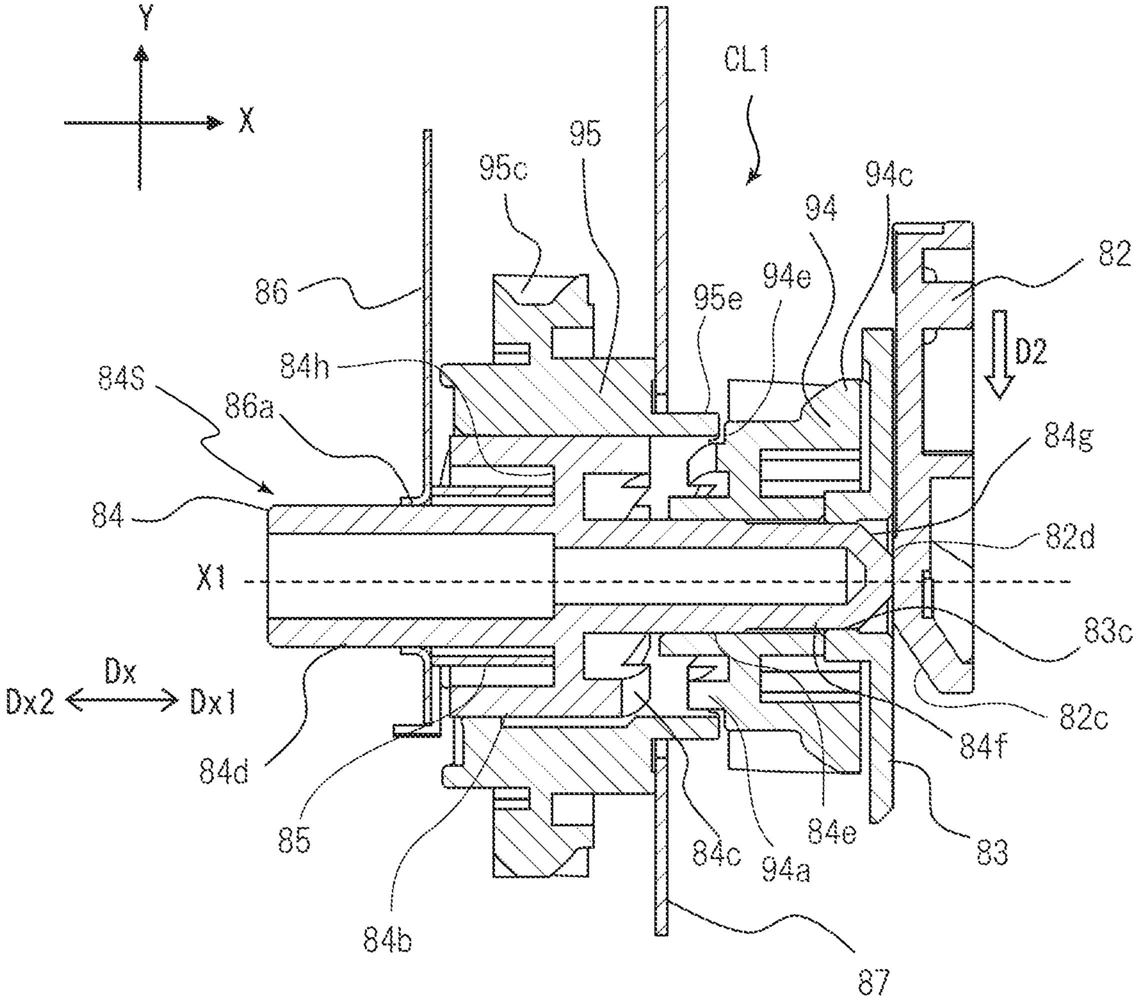
FIG. 21 is a cross-sectional view of the clutch portion according to the first embodiment.

A configuration of the clutch portion CL1 serving as a drive transmission mechanism according to the present embodiment will be described with reference to FIGS. 18 to 21. FIG. 18 is an exploded view of the clutch portion CL1. FIGS. 19 to 21 are each a cross-sectional view in which a cross-section of the clutch portion CL1 in a horizontal plane passing an axis X1 is viewed from an upper side.

As illustrated in FIG. 18, the clutch portion CL1 includes a driving gear 95, the driven gear 94, the release ratchet 84, and a compression spring 85. The driving gear 95, the driven gear 94 and the release ratchet 84 are each a rotary member that rotates around the axis X1 which is a common rotational axis.

The driving gear 95 is an example of a driving member that rotates around an axis by having a driving force transmitted from a drive source. The driven gear 94 is a driven member that rotates around the axis, and it is an example of a driven member that transmits the driving force to the objects to be driven. The release ratchet 84 is an intermediate member that rotates integrally with the driving member around the axis, and it is an example of an intermediate member that transmits the driving force from the driving member to the driven member. The compression spring 85 is an example of an urging member that urges the intermediate member to one side in the axial direction of the axis.

Hereafter, the direction(s) along the axis X1 is denoted as an axial direction(s) Dx, one side, i.e., first side, in the axial direction Dx is denoted as a first axial direction Dx1, and the other side, i.e., second side, in the axial direction Dx is denoted as a second axial direction Dx2.

The driving gear 95 includes a teeth portion 95*c* for receiving a driving force from the drive motor 311 (FIG. 3), and at least one recess portion 95*a* for engaging with the release ratchet 84.

The teeth portion 95*c* is meshed with a teeth portion of a counter gear connected to the drive motor 311 via a gear train not shown. That is, the driving gear 95 is connected to the drive motor 311 serving as a drive source via the counter gear and the gear train. The driving gear 95 is driven to rotate in a predetermined direction of rotation R1 by receiving a driving force, i.e., rotational torque, from the drive motor 311 via the teeth portion 95*c*.

The recess portion 95*a* is composed of at least one recessed shape, i.e., key groove or spline groove, that is dented to an outer side in a radial direction with respect to the axis X1 from a peripheral wall of a hole portion 95*b* having the shape of a cylindrical surface passed through the driving gear 95 in the axial direction Dx, and that extends in the axial direction Dx. The driving gear 95 is an annular member in which the hole portion 95*b* and the recess portion 95*a* are provided on an inner circumference side of the teeth portion 95*c*.

The release ratchet 84 includes a projected portion 84*a* that is engaged with the recess portion 95*a* of the driving gear 95, a ratchet portion 84*c*, and the shaft portion 84S.

The projected portion 84*a* is composed of at least one projected shape, or key, that is protruded from a cylindrical portion 84*b* fit to the hole portion 95*b* of the driving gear 95 to an outer side in a radial direction with respect to the axis X1. By the projected portion 84*a* engaging with, or fitting to, the recess portion 95*a* of the driving gear 95, relative rotation of the release ratchet 84 to the driving gear 95 is restricted. Further, the projected portion 84*a* is engaged, or fit, to the recess portion 95*a* slidably in the axial direction Dx. Therefore, the release ratchet 84 is configured to be rotated integrally with the driving gear 95 around the axis X1 and also relatively movably in the axial direction Dx with respect to the driving gear 95.

The ratchet portion 84*c* has a serrated, projected-recessed shape or notched shape in which a plurality of projected portions, i.e., ratchet pawls, are formed in the axial direction Dx along a circumferential direction around the axis X1. Regarding each of the projected portions, a plane 84*c*1 on a downstream side in the direction of rotation R1 extends approximately in parallel with the axial direction Dx, whereas a plane 84*c*2 on an upstream side in the direction of rotation R1 is inclined downstream in the direction of rotation R1 toward a tip of the projected portion, i.e., first axial direction Dx. Thereby, the pressure roller 9*b* is allowed to rotate freely in the predetermined direction while enabling drive transmission to the pressure roller 9*b*, as described below. The ratchet portion 84*c* is an engagement portion that transmits the driving force, or rotational torque, from the release ratchet 84 to the driven gear 94 by engaging with a ratchet portion 94*a*, i.e., engaged portion, of the driven gear 94 described below.

The shaft portion 84S includes a first part 84*d*, a second part 84*e*, and a third part 84*f* The first part 84*d*, the second part 84*e*, and the third part 84*f* are formed integrally in a state arranged in the named order in the first axial direction Dx1 on the axis X1. The shaft portion 84S is a shaft portion of an intermediate member that is disposed on the axis of the driving member and the driven member and that extends in the axial direction. The functions of the respective parts of the shaft portion 84S will be described below.

The driven gear 94 includes a hole portion 94*b* through which the shaft portion 84S of the release ratchet 84 passes, the ratchet portion 94*a* meshing with the ratchet portion 84*c* of the release ratchet 84, and a teeth portion 94*c* for outputting the driving force to the pressure roller 9*b*.

The second part 84*e* of the shaft portion 84S is inserted rotatably, or slidably, to the hole portion 94*b*. The driven gear 94 is supported by the shaft portion 84S of the release ratchet 84. That is, the second part 84*e* of the shaft portion 84S functions as a positioning portion for determining the position of the driven gear 94 in a direction orthogonal to the axis X1. The positioning portion, i.e., the second part 84*e*, of the present embodiment is an arc surface, or supporting surface, preferably a cylindrical surface, that slidably supports a cylindrical inner circumference surface of the hole portion 94*b* serving as a positioned portion, but the shapes of the positioning portion and the positioned portion can be varied appropriately. The release ratchet 84 is relatively movable in the axial direction Dx with respect to the driven gear 94. Further, the release ratchet 84 is relatively rotatable with respect to the driven gear 94 in a state where the ratchet portion 84*c* of the release ratchet 84 is removed from the ratchet portion 94*a* of the driven gear 94.

The ratchet portion 94*a* has a projected-recessed shape or notched shape that meshes with the ratchet portion 84*c* of the release ratchet 84. That is, the ratchet portion 94*a* has a serrated projected-recessed shape in which a plurality of projected portions, i.e., ratchet pawls, are formed in the axial direction Dx along the circumferential direction around the axis X1. Regarding each of the projected portions, a plane 94*a*1 upstream in the direction of rotation R1 of the driving gear 95 extends approximately in parallel with the axial direction Dx, whereas a plane 94*a*2 downstream in the direction of rotation R1 is inclined upstream in the direction of rotation R1 toward a tip of the projected portion, i.e., second axial direction Dx.

The teeth portion 94*c* is meshed with a teeth portion of the idler gear 93 (FIGS. 11 and 12) mentioned above. The driven gear 94 can output a driving force, or rotational torque, received from the drive motor 311 via the driving gear 95 and the release ratchet 84 toward the pressure roller 9*b* through meshing of the teeth portion 94*c* and the idler gear 93. That is, the driven gear 94 is connected to the pressure roller 9*b* serving as an object to be driven. The driven gear 94 is an annular member in which the hole portion 94*b* thereof is provided on an inner circumference side of the teeth portion 94*c*.

The driving gear 95 and the driven gear 94 are helical gears in which the directions of tooth traces of the teeth portions 95*c* and 94*c* are inclined with respect to the axial direction Dx. The direction of the tooth trace of the driven gear 94 is set such that a component in the axial direction Dx of reaction force received from the teeth of a gear i.e., the idler gear 93, meshed with the teeth portion 94*c* is in a direction, i.e., second axial direction Dx2, pressing the driven gear 94 toward the release ratchet 84. In other words, the direction of the tooth trace of the driven gear 94 is a direction toward the direction of rotation R1 of the driven gear 94 during drive transmission to the second axial direction Dx2. Thereby, it becomes possible to reduce the possibility of disengagement of the meshing of the ratchet portions 84*c* and 94*a* during drive transmission. Further, the direction of the tooth trace of the driving gear 95 is set such that a component in the axial direction Dx of force received from the teeth of the gear meshed with the teeth portion 95*c* cancels out the component in the axial direction Dx of the reaction force that the driven gear 94 receives from the idler gear 93.

The release ratchet 84 is movable between a first position, i.e., engagement position (position illustrated in FIG. 19) where the ratchet portion 84*c* is meshed with the ratchet portion 94*a* of the driven gear 94 and a second position, i.e., separation position (position illustrated in FIG. 21) where the meshing between the ratchet portion 84*c* and the ratchet portion 94*a* is released. The second position is a position toward the second axial direction Dx2 from the first position. In other words, the intermediate member according to the present embodiment is movable between a first position in the axial direction where the intermediate member is engaged with the driven member such that the driving force is transferred to the driven member and a second position that is on a second side opposite from the first side in the axial direction of the first position, the second position being a position where the intermediate member is released from the driven member such that the driving force is not transmitted to the driven member. Further, the recess portion 95*a* of the driving gear 95 and the projected portion 84*a* of the release ratchet 84 are configured such that a release ratchet 184 is movable in the area from the first position to the second position while the projected portion 84*a* remains fitted to the recess portion 95*a*.

A connected state of the clutch portion CL1 refers to a state in which the release ratchet 84 is positioned at the first position. The released state of the clutch portion CL1 refers to a state in which the release ratchet 84 is positioned at the second position.

As described below, the release ratchet 84 includes an inclined surface 84*g* serving as a receiving portion at a tip in the first axial direction Dx1 of the shaft portion 84S. The release ratchet 84 is configured to move from the first position to the second position by receiving a force containing a component in the second axial direction Dx2, i.e., other side in the axial direction, applied to the inclined surface 84*g*. The inclined surface 84*g* is provided at the tip of the shaft portion 84S passed through the hole portion 94*b* of the driven gear 94, positioned on the opposite side from the driving gear 95 in the axial direction Dx with the driven gear 94 interposed therebetween. In other words, the receiving portion according to the present embodiment is provided at a part of a shaft portion of the intermediate member, the part being protruded through the driven member to an opposite side from the driving member in the axial direction Dx.

The compression spring 85 urges the release ratchet 84 toward the first axial direction Dx1, i.e., one side in the axial direction Dx, that is, toward the first position.

As illustrated in FIG. 19, the clutch portion CL1 is supported by a frame member, i.e., a gear cover 83, a drive frame 86, and a main body frame 87, which are fixed to the apparatus body, i.e., the casing main body 72A, of the image forming apparatus 1. Specifically, the shaft portion 84S of the release ratchet 84 has the first part 84*d* fit to a hole portion 86*a* of the drive frame 86 and the third part 84*f* fit to a hole portion 83*c* of the gear cover 83. Thereby, the release ratchet 84 is rotatably supported by the drive frame 86 and the gear cover 83. Further, the release ratchet 84 is slidable in the axial direction Dx with respect to the drive frame 86 and the gear cover 83. Further, the gear cover 83 is a part of the gear box 83B accommodating a plurality of gears including the driven gear 94, as illustrated in FIG. 11.

The gear cover 83, the drive frame 86, and the main body frame 87 are plate-shaped members that spread approximately perpendicularly to the axial direction Dx. The gear cover 83 is a first supporting portion that supports the shaft portion 84S of the release ratchet 84 on one side in the axial direction Dx. The drive frame 86 is a second supporting portion that supports the shaft portion 84S of the release ratchet 84 on the other side in the axial direction Dx.

The compression spring 85 is arranged between the drive frame 86 and a receiving portion 84*h* of the release ratchet 84 in the axial direction Dx. Further, the compression spring 85 is mounted in a space formed between the shaft portion 84S and the cylindrical portion 84*b* of the release ratchet 84 in the radial direction with respect to the axis X1.

The teeth portion 95*c* of the driving gear 95 is arranged between the drive frame 86 and the main body frame 87 in the axial direction Dx. The driving gear 95 is restricted of its movement in the axial direction Dx by the drive frame 86 and the main body frame 87. The teeth portion 94*c* of the driven gear 94 is arranged between the main body frame 87 and the gear cover 83 in the axial direction Dx. The driven gear 94 is pressed in the first axial direction Dx1 by the release ratchet 84 urged in the first axial direction Dx1 by the compression spring 85 and pressed against the gear cover 83. Therefore, the driving gear 95, i.e., driving member, and the driven gear 94, i.e., driven member, according to the present embodiment are each supported by the release ratchet 84, i.e., intermediate member, and arranged between the first supporting portion, i.e., the gear cover 83, and the second supporting portion, i.e., the drive frame 86, in the axial direction Dx.

Further, the driving gear 95 includes an extended portion 95*e* in which the peripheral wall of the hole portion 95*b* is extended to protrude in the first axial direction Dx1 through an opening 87*a* formed on the main body frame 87. One portion 94*e* on a side surface of the driven gear 94 opposes the extended portion 95*e* of the driving gear 95 in the axial direction Dx. Therefore, even in a state where the release ratchet 84 is moved from the first position to the second position (FIG. 21), the movement of the driven gear 94 in the second axial direction Dx2 is restricted by the extended portion 95*e* of the driving gear 95. As described, the release ratchet 84 is movable in the axial direction Dx while the positions of the driving gear 95 and the driven gear 94 are set in the axial direction Dx excluding clearances and fabrication tolerances that are required from the viewpoint of design.

Operation of Clutch Portion

The operation of the clutch portion CL1 will be described with reference to FIGS. 19 to 21. FIG. 19 is a cross-sectional view illustrating the clutch portion CL1 in the connected state. FIG. 20 is a cross-sectional view illustrating the clutch portion CL1 in midway of switching from the connected state to the released state. FIG. 21 is a cross-sectional view illustrating the clutch portion CL1 in the released state.

As described above, in a state where the rear cover 73 of the image forming apparatus 1 is closed (FIGS. 4 and 7), the pressing portion 82*b* of the release link 82 of the drive release mechanism 90 is positioned at a position, i.e., third position, where it does not press the shaft portion 84S of the release ratchet 84 (FIGS. 11 and 12). In this case, since the release ratchet 84 is retained at the first position by the urging force of the compression spring 85 as illustrated in FIG. 19, the connected state of the clutch portion CL1 is maintained.

In a state where the clutch portion CL1 is connected, the driving force of the drive motor 311 is transmitted via the clutch portion CL1 to the pressure roller 9*b*. That is, in a state where the driving gear 95 is rotated in the direction of rotation R1 by the driving force transmitted from the drive motor 311 via a gear train, the release ratchet 84 rotates integrally with the driving gear 95 due to the engagement of the projected portion 84*a* of the release ratchet 84 with the recess portion 95*a* of the driving gear 95. Further, since the ratchet portion 84*c* of the release ratchet 84 is meshed with the ratchet portion 94*a* of the driven gear 94, the driven gear 94 rotates in the direction of rotation R1 integrally with the release ratchet 84.

FIG. 20 illustrates a state in which the rear cover 73 is pivoted for approximately four degrees from the closed position toward the opened position, i.e., of the same point of time as FIG. 15. As mentioned above, in accordance with the operation of opening the rear cover 73, the release lever 80 and the release link 82 are moved. Then, the pressing portion 82*b* of the release link 82 contacts the shaft portion 84S of the release ratchet 84.

As illustrated in FIG. 20, inclined surfaces 82*c* and 84*g* for generating a force containing a component in the second axial direction Dx2 are provided on the pressing portion 82*b* of the release link 82 and the shaft portion 84S of the release ratchet 84. An inclined surface 82*c* of the release link 82 is inclined in the first axial direction Dx1, i.e., one side in the axial direction Dx, toward a movement direction D2 (FIG. 15) of the pressing portion 82*b* around the boss 83*a*. The inclined surface 84*g* of the release ratchet 84 is inclined in the first axial direction Dx1, i.e., one side in the axial direction Dx, toward the movement direction D2 of the pressing portion 82*b*. Therefore, when the pressing portion 82*b* moves in the movement direction D2, the inclined surface 82*c* of the pressing portion 82*b* presses the inclined surface 84*g* of the shaft portion 84S in the second axial direction Dx2. That is, the inclined surface 84*g* provided on the shaft portion 84S of the release ratchet 84 functions as a receiving portion that receives a force, i.e., force containing a component in the second axial direction Dx2, by which the release ratchet 84 is moved from the first position to the second position against the urging force of the compression spring 85, from the actuating portion enabling.

The inclined surface 84*g* is positioned inward of an outer circumference surface of the second part 84*e* of the shaft portion 84S fit to the hole portion 94*b* of the driven gear 94 in a radial direction of rotation, i.e., direction orthogonal to the axis X1, of the release ratchet 84. That is, the receiving portion of the present embodiment is positioned inward of the positioning portion for positioning the driven member in the radial direction of rotation of the intermediate member. Further, the inclined surface 84*g* is positioned inward of ratchet portions 84*c* and 94*a* of the release ratchet 84 and the driven gear 94 in the radial direction of rotation, i.e., direction orthogonal to the axis X1, of the release ratchet 84. That is, according to the present embodiment, regarding the radial direction of rotation of the intermediate member, the receiving portion is positioned inward of the engagement portion of the intermediate member and the engaged portion of the driven member.

According to the configuration mentioned above, the release link 82 pivots in accordance with the pivoting of the rear cover 73, and the release ratchet 84 moves in the second axial direction Dx2 against the urging force of the compression spring 85. However, at the point of time illustrated in FIG. 20, the meshing of the ratchet portions 84*c* and 94*a* of the release ratchet 84 and the driven gear 94 is not yet released. Further according to the present embodiment, the inclined surfaces 82*c* and 84*g* for generating the force containing the component in the second axial direction Dx2 are provided on both the pressing portion 82*b* of the release link 82 and the shaft portion 84S of the release ratchet 84, but a similar force occurs when an inclined surface is arranged at least on one of the two portions.

FIG. 21 illustrates a state in which the rear cover 73 is pivoted for approximately nine degrees from the closed position to the opened position, i.e., of the same point of time as FIG. 16. If the rear cover 73 is pivoted for approximately nine degrees, the release ratchet 84 is moved in the second axial direction Dx2 to a position at which the meshing of the ratchet portions 84*c* and 94*a* of the release ratchet 84 and the driven gear 94 is released. That is, by the release ratchet 84 moving from the first position to the second position against the urging force of the compression spring 85, the clutch portion CL1 is switched from the connected state to the released state.

As mentioned above, the release lever 80 and the release link 82 are retained at the position illustrated in FIG. 16 while the rear cover 73 pivots from the closed position to the opened position passing the nine-degree position. In this state, as illustrated in FIG. 21, the release ratchet 84 is retained at the second position by a planar portion 82*d* of the release link 82. In other words, the pressing portion 82*b*, i.e., actuating portion, of the release link 82 is positioned at a fourth position in contact with the shaft portion 84S of the intermediate member and retaining the intermediate member at the second position. Therefore, after the clutch portion CL1 is switched from the connected state to the released state during the process of opening the rear cover 73, the released state of the clutch portion CL1 is maintained while the rear cover 73 is in the opened state. Thereby, the pressure roller 9*b* is in a freely rotatable state without receiving load from the drive transmission elements upstream of the clutch portion CL1, and the user can easily perform jam removal.

As illustrated in FIG. 16, the actuating portion, i.e., the pressing portion 82*b*, of the present embodiment is movable to a position overlapped with the axis X1 when viewed in the axial direction Dx, i.e., X direction. Therefore, the actuating portion, i.e., the pressing portion 82*b*, can move the shaft portion 84S on the axis X1 or in the vicinity of the axis X1.

Further, as illustrated in FIG. 21, the planar portion 82*d*, i.e., abutment surface or contact portion, of the pressing portion 82*b* contacts the shaft portion 84S on the axis X1. That is, the actuating portion, i.e., the pressing portion 82*b*, of the present embodiment includes an abutment surface capable of retaining the intermediate member in the second position against the urging force of the urging member, i.e., the compression spring 85, by abutting against the shaft portion 84S of the intermediate member, i.e., the release ratchet 84, at a position overlapped with the axis X1 when viewed in the axial direction Dx. The planar portion 82*d* is a planar surface substantially perpendicular to the axis X1. The surface, i.e., abutted surface, of the shaft portion 84S abutted against the planar portion 82*d* is a planar surface approximately perpendicular to the axis X1. The abutted surface according to the present embodiment is provided at a tip of the shaft portion 84S in the first axial direction Dx1, and a truncated cone shape is formed by the inclined surface 84*g* and the abutted surface.

Thereafter, when the rear cover 73 in the opened state starts to close, as mentioned above, the release lever 80 and the release link 82 move in accordance with the rear cover 73 (FIG. 17). Therefore, the pressing portion 82*b* of the release link 82 moves to a position where it does not press the shaft portion 84S of the release ratchet 84 (FIG. 19). Thereby, the release ratchet 84 moves from the second position to the first position by the urging force of the compression spring 85, and the clutch portion CL1 transits from the released state to the connected state.

Now, the operation of the clutch portion CL1 will be described of a case where jam removal is performed by the user holding and pulling out the jammed sheet exposed from the sheet discharge port 15 while the rear cover 73 is still in the closed state. In this case, the user pulls out the jammed sheet while the release ratchet 84 is still positioned at the first position illustrated in FIG. 19.

When the user pulls out the jammed sheet, the pressure roller 9*b* is pulled by the jammed sheet and rotates in the direction of rotation along the conveyance direction of the recording material. Thereby, the driven gear 94 connected to the pressure roller 9*b* via the pressure roller gear 91 and the idler gear 93 (FIG. 12) attempts to rotate in the direction of rotation R1 (FIG. 18) during drive transmission. Meanwhile, since the drive motor 311 is stopped, the release ratchet 84 attempts to stop without being rotated in the direction of rotation R1 by the inertia of the drive transmission elements from the drive motor 311 to the driving gear 95.

In the present embodiment, since the release ratchet 84 and the driven gear 94 are engaged by the ratchet portions 84*c* and 94*a*, the driven gear 94 is allowed to rotate in the direction of rotation R1 by the slipping of ratchet portions 84*c* and 94*a*. That is, the ratchet portions 84*c* and 94*a* constitute a ratchet mechanism of allowing rotation of the pressure roller 9*b* in a state where the drive motor 311 is in the stopped state while allowing drive transmission from the drive motor 311 to the pressure roller 9*b*. When the ratchet portions 84*c* and 94*a* slip, the release ratchet 84 moves in the second axial direction Dx2 against the urging force of the compression spring 85. Therefore, when the user draws out the jammed sheet from the sheet discharge port 15, the pressure roller 9*b* rotates while receiving a load, i.e., force caused by the urging force of the compression spring 85, smaller than the load of the drive motor 311. Therefore, even when the clutch portion CL1 is still in the connected state, jam removal in which a jammed sheet is drawn out from the sheet discharge port 15 can be performed easily.

The load of rotating the pressure roller 9*b* while the clutch portion CL1 is maintaining the connected state is greater than the load of rotating the pressure roller 9*b* while the clutch portion CL1 is in the released state.

Summary of the Present Embodiment

As described above, the clutch portion CL1 according to the present embodiment is configured to switch from the connected state to the released state by having the inclined surface 84*g* serving as the receiving portion provided on the shaft portion 84S of the release ratchet 84 pressed in the second axial direction Dx2. In other words, the shaft portion 84S of an intermediate member, i.e., the release ratchet 84, according to the present embodiment includes a receiving portion configured to receive the force, by which the intermediate member is moved from the first position to the second position, from the actuating portion, i.e., the pressing portion 82*b* of the release link 82. The receiving portion is positioned inward of the positioning portion, i.e., the outer circumference surface of the second part 84*e* of the shaft portion 84S, for positioning the driven member, i.e., the driven gear 94, in the radial direction of rotation of the intermediate member. Therefore, compared to a case as taught in the above-mentioned document in which an annular cam member is arranged in the circumference of the axis X1 as a configuration for releasing the drive transmission, the clutch portion CL1 can be downsized in the radial direction with respect to the axis X1. That is, according to the present embodiment, space-saving property of the drive transmission mechanism capable of releasing the drive transmission from the drive source to the objects to be driven in the image forming apparatus can be improved.

According further to the present embodiment, regarding the radial direction of rotation of the intermediate member, the receiving portion is positioned inward of the engagement portion of the intermediate member and the engaged portion of the driven member, such that the space-saving property of the drive transmission mechanism can be further improved.

Even further according to the present embodiment, the clutch portion CL1 is configured to switch from the connected state to the released state in accordance with the operation of opening the rear cover 73, i.e., opening/closing member, such that jam removal can be performed easily while downsizing the image forming apparatus 1.

Second Embodiment

Next, the clutch portion CL2 according to the second embodiment will be described with reference to FIGS. 22 to 25. The clutch portion CL2 according to the present embodiment can be used as a drive transmission mechanism of the image forming apparatus 1 instead of the clutch portion CL1 of the first embodiment. Hereafter, elements denoted with the same reference numbers as the first embodiment are assumed to have approximately the same configurations and functions as those described in the first embodiment, and only the portions that differ from the first embodiment will mainly be described.

Figure 22:
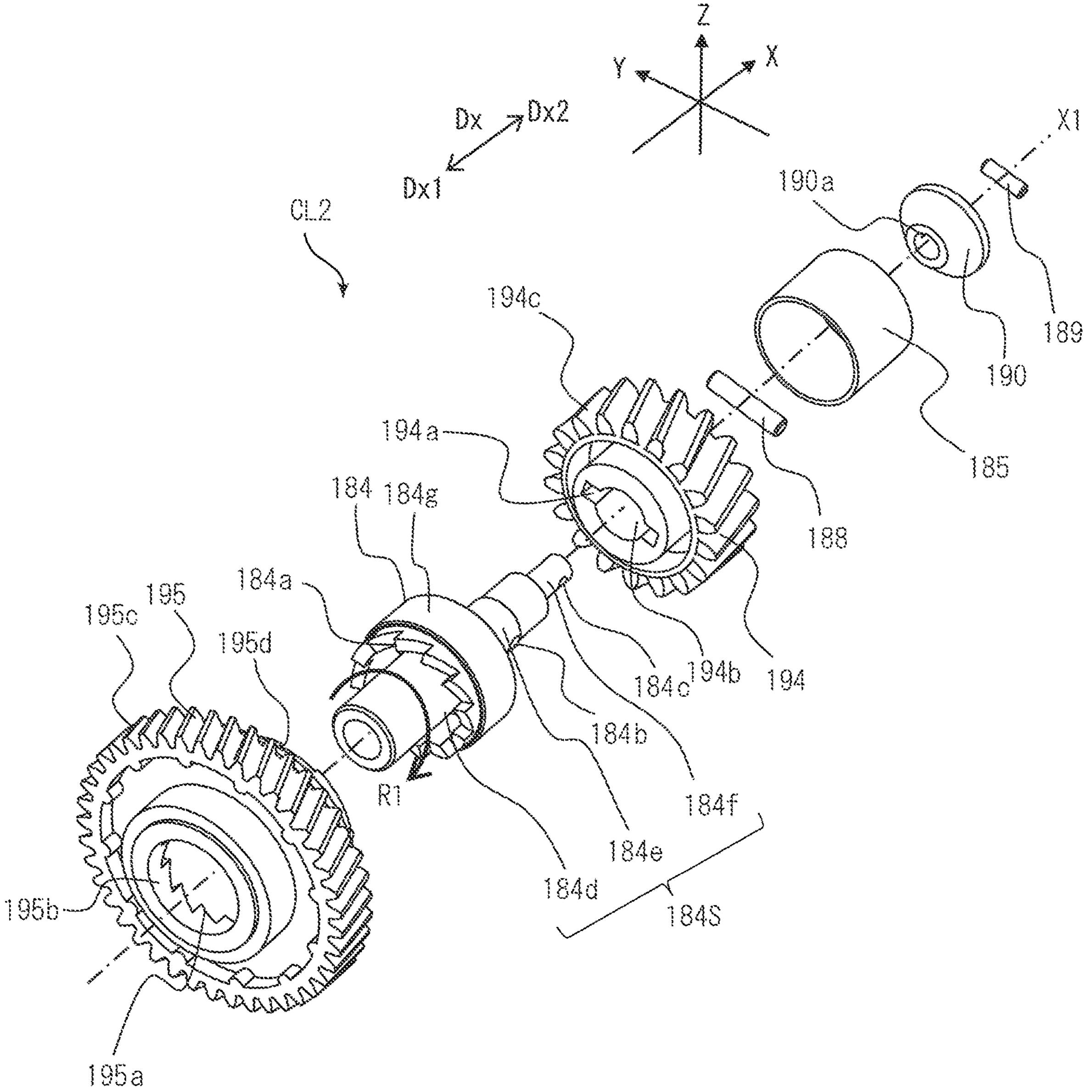
FIG. 22 is an exploded view of a clutch portion according to a second embodiment.
Figure 23:
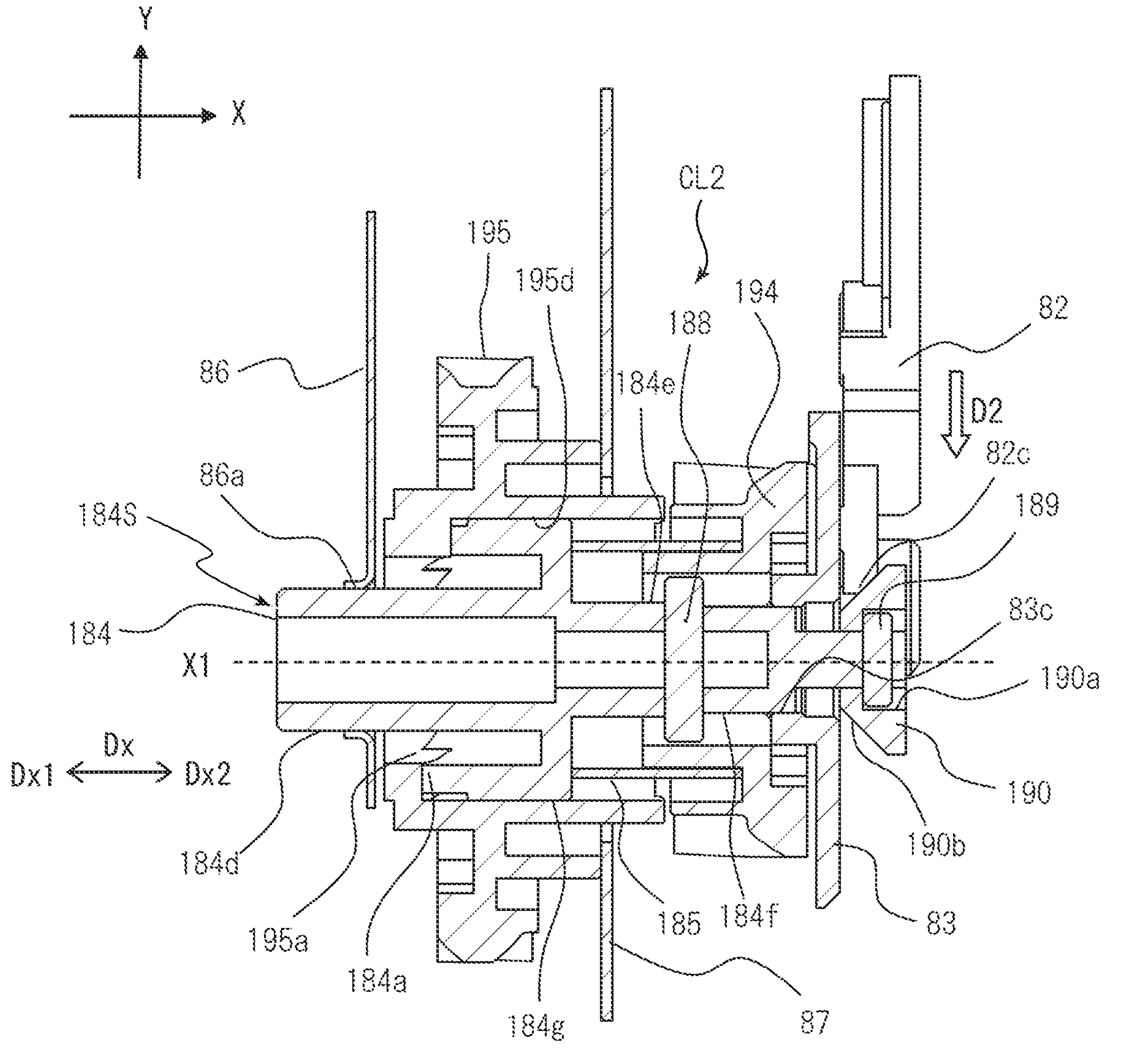
FIG. 23 is a cross-sectional view of the clutch portion according to the second embodiment.
Figure 24:
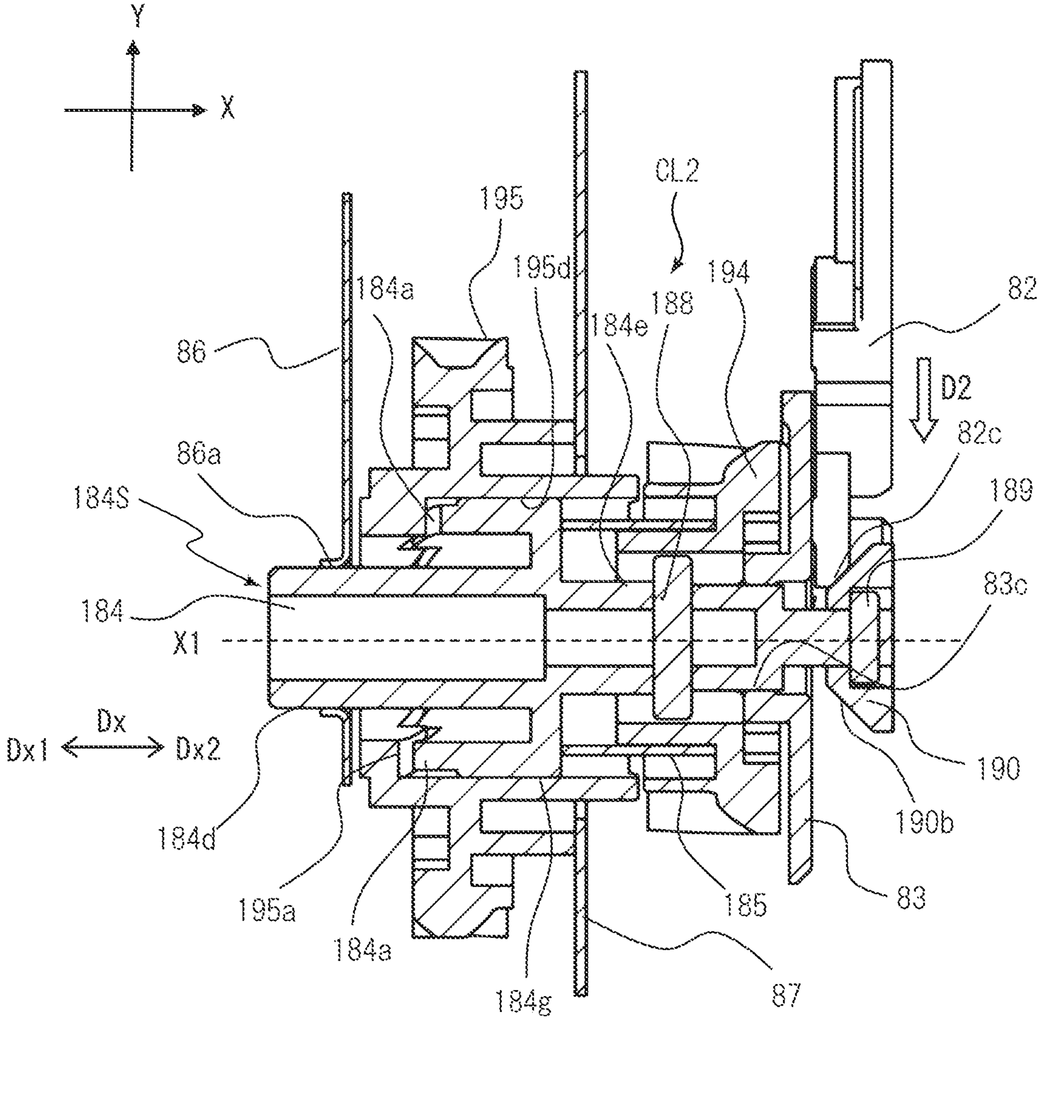
FIG. 24 is a cross-sectional view of the clutch portion according to the second embodiment.
Figure 25:
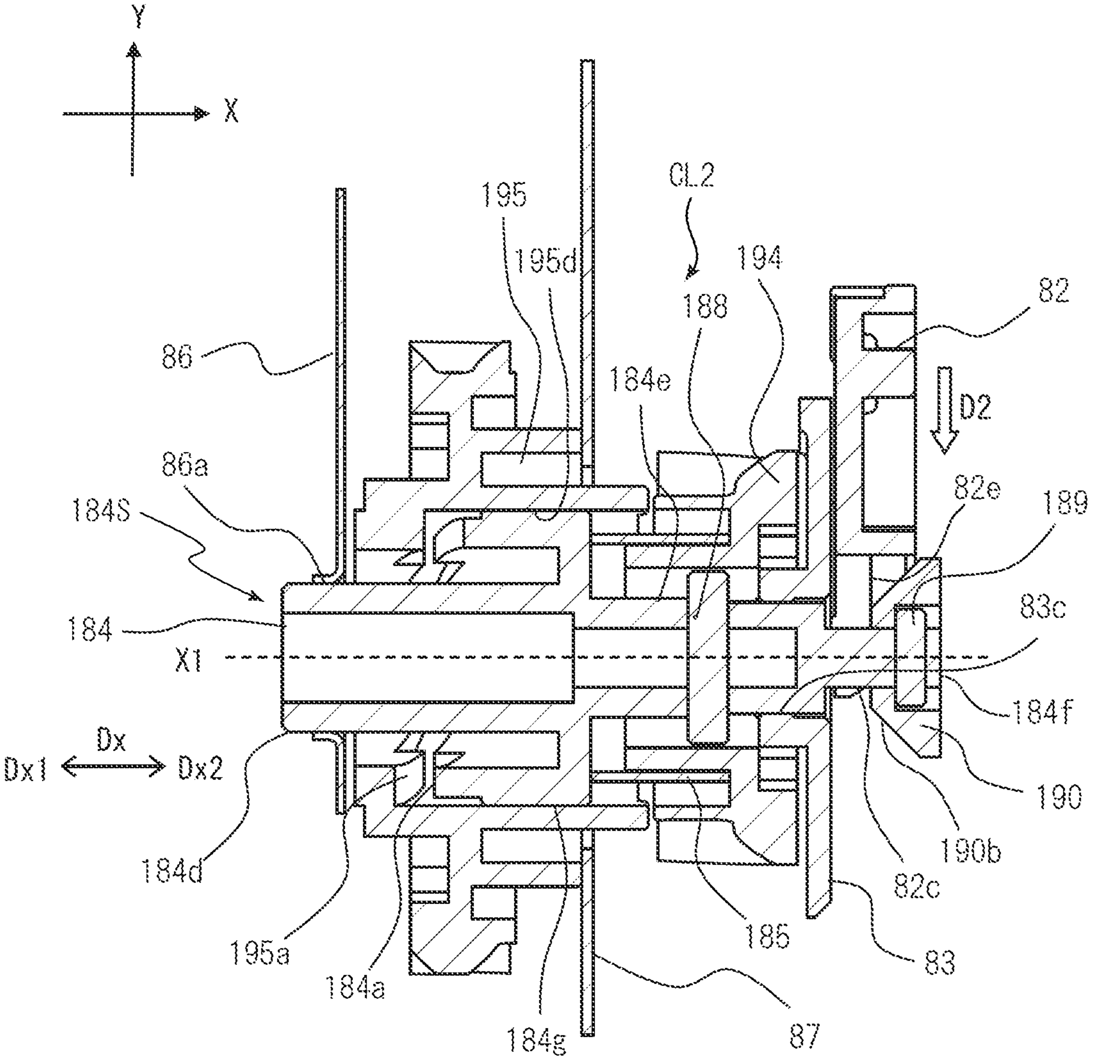
FIG. 25 is a cross-sectional view of the clutch portion according to the second embodiment.

FIG. 22 is an exploded view of the clutch portion CL2. FIGS. 23 to 25 are each a cross-sectional view in which a cross-section of a horizontal plane passing the axis X1 of the clutch portion CL2 is viewed from above. FIG. 23 is a cross-sectional view illustrating the clutch portion CL2 in the connected state.

As illustrated in FIG. 22, the clutch portion CL2 includes a driving gear 195, a driven gear 194, the release ratchet 184, and a compression spring 185. The driving gear 195, the driven gear 194, and the release ratchet 184 are each a rotary member that rotates around an axis X1 serving as a common rotational axis.

The driving gear 195 is an example of a driving member that rotates around an axis by having a driving force transmitted from a drive source. The driven gear 194 is a driven member rotated around the axis, and it serves as an example of a driven member that transmits the driving force to the objects to be driven. The release ratchet 184 is an intermediate member that rotates integrally with the driven member around the axis, and it serves as an example of an intermediate member that transmits the driving force from the driving member to the driven member. The compression spring 185 is an example of an urging member that urges the intermediate member to one side in the axial direction of the axis.

Hereafter, the direction(s) along the axis X1 is denoted as an axial direction(s) Dx, one side, i.e., first side, of the axial direction Dx is denoted as a first axial direction Dx1, and the other side, i.e., second side, of the axial direction Dx is denoted as a second axial direction Dx2.

The driving gear 195 includes a teeth portion 195*c* for receiving the driving force from the drive motor 311 (FIG. 3), a ratchet portion 195*a* for engaging with the release ratchet 184, a hole portion 195*b* through which the release ratchet 184 is inserted, and a cylindrical portion 195*d*.

The teeth portion 195*c* is meshed with a teeth portion of a counter gear connected to the drive motor 311 through a gear train not shown. That is, the driving gear 195 is connected to the drive motor 311 serving as a drive source via a counter gear and a gear train. The driving gear 195 is driven to rotate in the predetermined direction of rotation R1 by receiving the driving force, or rotational torque, from the drive motor 311 via the teeth portion 195*c*.

The hole portion 195*b* has a cylindrical surface shape that passes through the driving gear 195 in the axial direction Dx. The driving gear 195 is an annular member whose hole portion 195*b* is provided on the inner circumference side of the teeth portion 195*c*. A first part 184*d* of a shaft portion 184S of the release ratchet 184 described below is inserted rotatably, or slidably, in the hole portion 195*b*. The driving gear 195 is supported on the shaft portion 184S of the release ratchet 184. The release ratchet 184 is relatively movable in the axial direction Dx with respect to the driving gear 195. Further, the release ratchet 184 is relatively rotatable with respect to the driving gear 195 in a state where a ratchet portion 184*a* of the release ratchet 184 is separated from the ratchet portion 195*a* of the driving gear 195.

The ratchet portion 195*a* has a serrated projected-recessed shape in which a plurality of projected portions, or ratchet pawls, in the axial direction Dx are formed along the circumferential direction around the axis X1. As for each of the projected portions, the plane downstream of the driving gear 195 in the direction of rotation R1 extends approximately parallel to the axial direction Dx while the plane upstream thereof in the direction of rotation R1 is inclined downstream in the direction of rotation R1 toward a tip of the projected portion. Thereby, the pressure roller 9*b* is allowed to rotate freely in the predetermined direction while enabling drive transmission to the pressure roller 9*b*. The ratchet portion 195*a* is an engaged portion for transmitting driving force, or rotational torque, from the driving gear 195 to the release ratchet 184 by being engaged with the ratchet portion 184*a*, i.e., engagement portion, of the release ratchet 184 described below.

The cylindrical portion 195*d* (refer also to FIG. 23) is a portion, i.e., supported portion or positioned portion, in which the driving gear 195 is supported slidably by the release ratchet 184. The cylindrical portion 195*d* according to the present embodiment is a cylindrical portion that extends in the axial direction Dx with respect to the axis X1 on an inner side of the teeth portion 195*c* in the radial direction.

The release ratchet 184 includes the ratchet portion 184*a*, a cylindrical portion 184*g*, and the shaft portion 184S. Parallel pins 188 and 189 and an inclined surfaced member 190 are mounted to the shaft portion 184S.

The ratchet portion 184*a* includes a serrated projected-recessed shape in which a plurality of projected portions, or ratchet pawls, in the axial direction Dx are formed along the circumferential direction around the axis X1. As for each of the projected portions, the plane downstream in the direction of rotation R1 extends approximately parallel to the axial direction Dx while the plane upstream in the direction of rotation R1 is inclined downstream in the direction of rotation R1 toward a tip of the projected portion.

The cylindrical portion 184*g* (refer also to FIG. 23) is a cylindrical surface that slidably supports the cylindrical portion 195*d* of the driving gear 195. That is, the cylindrical portion 184*g* functions as a positioning portion that determines the position of the driving gear 195 in the direction orthogonal to the axis X1. The positioning portion, i.e., the cylindrical portion 184*g*, according to the present embodiment is an arc surface, i.e., supporting surface, preferably a cylindrical surface, that slidably supports a cylindrical inner circumference surface of the cylindrical portion 195*d* serving as a positioned portion, but the shapes of the positioning portion and the positioned portion can be changed appropriately.

The shaft portion 184S includes the first part 184*d*, a second part 184*e*, and a third part 184*f* The first part 184*d*, the second part 184*e*, and the third part 184*f* are integrally formed in the state arranged in the named order in the first axial direction Dx1 on the axis X1. The shaft portion 184S is a shaft portion of an intermediate member that is provided on the axis of the driving member and the driven member and that extends in the axial direction. The functions of respective parts of the shaft portion 184S will be described below.

A hole portion 184*b* to which a parallel pin 188 is attached is provided on the second part 184*e* of the shaft portion 184S. Relative rotation of the release ratchet 184 and the driven gear 194 is restricted by having a portion, i.e., engagement portion, protruded from the shaft portion 184S of the parallel pin 188 engage with, or fit to, a pin groove 194*a* provided on the driven gear 194. The parallel pin 188 is engaged, or fit, slidably in the axial direction Dx with respect to the pin groove 194*a*. Therefore, the release ratchet 184 is configured to rotate integrally with the driven gear 194 around the axis X1 and relatively rotatably in the axial direction Dx with respect to the driven gear 194.

A hole portion 184*c* to which a parallel pin 189 is mounted is provided on the third part 184*f* of the shaft portion 184S. Further, the inclined surfaced member 190 is attached to the shaft portion 184S in a state where relative movement in the axial direction Dx and relative rotation with respect to the shaft portion 184S are restricted by having the parallel pin 189 fit to a pin groove 190*a* of the inclined surfaced member 190.

The inclined surfaced member 190 is a conical member having a diameter that widens in the second axial direction Dx2. The inclined surfaced member 190 can also be formed integrally with other portions of the release ratchet 184.

The driven gear 194 includes the pin groove 194*a*, a hole portion 194*b* through which the shaft portion 184S of the release ratchet 184 passes, and a teeth portion 194*c* for outputting the driving force to the pressure roller 9*b*.

The hole portion 194*b* is a cylindrical through hole provided on the inner circumference side of the teeth portion 194*c*. The driven gear 194 is an annular member having the hole portion 194*b* provided on the inner circumference side of the teeth portion 194*c*. The pin groove 194*a* is a groove shape that is dented toward the outer side in the radial direction from an inner wall of the hole portion 194*b* and that is extended in the axial direction Dx.

The teeth portion 194*c* is meshed with a teeth portion of an idler gear 193 (FIGS. 11 and 12) mentioned above. The driven gear 194 can output the driving force, or rotational torque, received from the drive motor 311 via the driving gear 195 and the release ratchet 184 toward the pressure roller 9*b* via the meshing of the teeth portion 194*c* and the idler gear 193. That is, the driven gear 194 is connected to the pressure roller 9*b* serving as an object to be driven.

The driving gear 195 and the driven gear 194 are helical gears in which the directions of tooth traces of teeth portions 195*c* and 194*c* are inclined with respect to the axial direction Dx. The direction of the tooth trace of the driving gear 195 is set such that a component in the axial direction Dx of force received from the teeth of a gear meshed with the teeth portion 195*c* is in a direction, i.e., second axial direction Dx2, pressing the driving gear 195 toward the release ratchet 184. In other words, the direction of the tooth trace of the driving gear 195 is a direction toward the direction of rotation R1 of the driving gear 195 during drive transmission to the first axial direction Dx1. Thereby, it becomes possible to reduce the possibility of disengagement of the meshing of the ratchet portions 184*a* and 195*a* during drive transmission. Further, the direction of the tooth trace of the driven gear 194 is set such that a component in the axial direction Dx of reaction force received from the teeth of the gear, i.e., the idler gear 93, meshed with the teeth portion 194*c* cancels out the component in the axial direction Dx of the force that the driving gear 195 receives from the teeth portion 195*c*.

The release ratchet 184 is movable between a first position, i.e., engagement position (position illustrated in FIG. 23) where the ratchet portion 184*a* is meshed with the ratchet portion 195*a* of the driving gear 195 and a second position, i.e., separation position (position illustrated in FIG. 25) where the meshing between the ratchet portion 184*a* and the ratchet portion 195*a* is released. The second position is a position toward the second axial direction Dx2 from the first position. In other words, the intermediate member according to the present embodiment is movable between a first position in the axial direction where the intermediate member is engaged with the driving member such that the driving force is received from the driving member and a second position that is on a second side opposite from the first side in the axial direction of the first position, the second position being a position where the intermediate member is separated from the driving member such that the driving force is not received from the driving member. Further, the pin groove 194*a* of the driven gear 194 is configured such that the release ratchet 184 can move in the area from the first position to the second position while having the parallel pin 188 remain fitted in the pin groove 194*a*.

The connected state of the clutch portion CL2 is a state in which the release ratchet 184 is positioned at the first position. The released state of the clutch portion CL2 is a state in which the release ratchet 184 is positioned at the second position.

As described below, the release ratchet 184 includes an inclined surface 190*b* serving as a receiving portion at a tip in the first axial direction Dx1 of the shaft portion 184S. The release ratchet 184 is configured to move from the first position to the second position by receiving a force containing a component in the second axial direction Dx2, i.e., other side in the axial direction, applied to the inclined surface 190*b*.

The inclined surface 190*b* is positioned inward of the cylindrical portion 184*g* of the release ratchet 184 supporting the cylindrical portion 195*d* of the driving gear 195 in the radial direction of rotation, i.e., direction orthogonal to the axis X1, of the release ratchet 184. That is, the receiving portion according to the present embodiment is positioned inward of the positioning portion for positioning the driving member in the radial direction of rotation of the intermediate member. Further, the inclined surface 190*b* is positioned inward of the ratchet portions 184*a* and 195*a* of the release ratchet 184 and the driving gear 195 in a radial direction of rotation, i.e., direction orthogonal to the axis X1, of the release ratchet 184. That, in the present embodiment, the receiving portion is positioned inward of the engagement portion of the intermediate member and the engaged portion of the driving member with respect to the radial direction of rotation of the intermediate member.

The compression spring 185 urges the release ratchet 184 toward the first axial direction Dx1, i.e., one side in the axial direction Dx, that is, toward the first position.

As illustrated in FIG. 23, the clutch portion CL2 is supported by a frame member, i.e., the gear cover 83, the drive frame 86, and the main body frame 87, fixed to the apparatus body, i.e., the casing main body 72A, of the image forming apparatus 1. Specifically, the shaft portion 184S of the release ratchet 184 has the first part 184*d* fit to the hole portion 86*a* of the drive frame 86 and the second part 184*e* fit to a hole portion 83*c* of the gear cover 83. Thereby, the release ratchet 184 is rotatably supported by the drive frame 86 and the gear cover 83. Further, the release ratchet 184 is slidable in the axial direction Dx with respect to the drive frame 86 and the gear cover 83.

The gear cover 83, the drive frame 86, and the main body frame 87 are plate-shaped members that spread approximately perpendicularly to the axial direction Dx. The drive frame 86 is a first supporting portion that supports the shaft portion 184S of the release ratchet 184 on one side in the axial direction Dx. The gear cover 83 is a second supporting portion that supports the shaft portion 184S of the release ratchet 184 on the other side in the axial direction Dx.

The compression spring 185 is arranged between the release ratchet 184 and the driven gear 194 in the axial direction Dx. Further, the compression spring 185 is mounted in a space on the outer circumference side of the shaft portion 184S of the release ratchet 184 in the radial direction of the axis X1 and on the inner circumference side of the teeth portions 195*c* and 194*c* of the driving gear 195 and the driven gear 194.

The teeth portion 195*c* of the driving gear 195 is arranged between the drive frame 86 and the main body frame 87 in the axial direction Dx. The driving gear 195 is restricted of its movement in the axial direction Dx by the drive frame 86 and the main body frame 87. The teeth portion 194*c* of the driven gear 194 is arranged between the main body frame 87 and the gear cover 83 in the axial direction Dx. The driving gear 195 is pressed in the first axial direction Dx1 by the release ratchet 184 urged in the first axial direction Dx1 by the compression spring 185 and pressed against the drive frame 86. Further, the driven gear 194 is urged in the second axial direction Dx2 by the compression spring 185 and pressed against the gear cover 83. Therefore, the driving gear 195, i.e., driving member, and the driven gear 194, i.e., driven member, are each supported by the release ratchet 184, i.e., intermediate member, and arranged between the first supporting portion and the second supporting portion, i.e., the gear cover 83 and the drive frame 86, in the axial direction Dx.

Further, the driving gear 195 includes an extended portion 195*e* which is extended to protrude in the first axial direction Dx1 through the opening 87*a* formed on the main body frame 87. One portion on a side surface of the driven gear 194 opposes the extended portion 195*e* of the driving gear 195 in the axial direction Dx. Therefore, even in a state where the release ratchet 184 is moved from the first position to the second position (FIG. 25), the movement of the driving gear 195 in the second axial direction Dx2 is restricted by the extended portion 95*e* of the driving gear 195. As described, the release ratchet 184 is movable in the axial direction Dx while the positions of the driving gear 195 and the driven gear 194 are set in the axial direction Dx excluding clearances and fabrication tolerances that are required from the viewpoint of design.

Operation of Clutch Portion

The operation of the clutch portion CL2 will be described with reference to FIGS. 23 to 25. FIG. 23 is a cross-sectional view illustrating the clutch portion CL2 in the connected state. FIG. 24 is a cross-sectional view illustrating the clutch portion CL2 in midway of switching from the connected state to the released state. FIG. 25 is a cross-sectional view illustrating the clutch portion CL2 in the released state.

In a state where the rear cover 73 of the image forming apparatus 1 is closed (FIGS. 4 and 7), the pressing portion 82*b* of the release link 82 of the drive release mechanism 90 is positioned at a position where it does not press the shaft portion 184S of the release ratchet 184 (FIGS. 11 and 12). In this case, since the release ratchet 184 is retained at the first position by the urging force of the compression spring 185 as illustrated in FIG. 23, the connected state of the clutch portion CL2 is maintained.

In a state where the clutch portion CL2 is connected, the driving force of the drive motor 311 is transmitted via the clutch portion CL2 to the pressure roller 9*b*. That is, in a state where the driving gear 195 is rotated in the direction of rotation R1 by the driving force transmitted from the drive motor 311 via a gear train, the release ratchet 184 rotates integrally with the driving gear 195 in the direction of rotation R1 by the meshing of the ratchet portions 184*a* and 195*a*. Further, due to the engagement of the parallel pin 188 attached to the release ratchet 184 and the pin groove 194*a* of the driven gear 194, the driven gear 194 rotates integrally with the release ratchet 184 in the direction of rotation R1.

FIG. 24 illustrates a state in which the rear cover 73 is pivoted for approximately four degrees from the closed position toward the opened position, i.e., of the same point of time as FIG. 15. As mentioned above, in accordance with the operation of opening the rear cover 73, the release lever 80 and the release link 82 are moved. Then, the pressing portion 82*b* of the release link 82 contacts the shaft portion 184S of the release ratchet 184.

As illustrated in FIG. 24, the inclined surface 190*b* for generating a force containing a component in the second axial direction Dx2 is provided on the inclined surfaced member 190 provided on the shaft portion 184S of the release ratchet 184. The inclined surface 82*c* of the release link 82 is inclined in the first axial direction Dx1, i.e., one side in the axial direction Dx, toward the movement direction D2 (FIG. 15) of the pressing portion 82*b* around the boss 83*a*. The inclined surface 190*b* of the release ratchet 184 is inclined in the first axial direction Dx1, i.e., one side in the axial direction Dx, toward the movement direction D2 of the pressing portion 82*b*. Therefore, when the pressing portion 82*b* moves in the movement direction D2, the inclined surface 82*c* of the pressing portion 82*b* presses the inclined surface 190*b* in the second axial direction Dx2. That is, the inclined surface 190*b* on the shaft portion 184S of the release ratchet 184 functions as a receiving portion that receives a force, i.e., force containing a component in the second axial direction Dx2, by which the release ratchet 184 is moved from the first position to the second position against the urging force of the compression spring 185, from the actuating portion.

According to the configuration mentioned above, the release link 82 pivots in accordance with the pivoting of the rear cover 73, and the release ratchet 184 moves in the second axial direction Dx2 against the urging force of the compression spring 185. However, at the point of time illustrated in FIG. 24, the meshing of the ratchet portions 184*a* and 195*a* of the release ratchet 184 and the driving gear 195 is not yet released. Further according to the present embodiment, the inclined surfaces 82*c* and 190*b* for generating the force containing the component in the second axial direction Dx2 are arranged on both the pressing portion 82*b* of the release link 82 and the shaft portion 184S of the release ratchet 184, but a similar force occurs when an inclined surface is arranged at least on one of the two portions.

FIG. 25 illustrates a state in which the rear cover 73 is pivoted for approximately nine degrees from the closed position to the opened position, i.e., of the same point of time as FIG. 16. If the rear cover 73 is pivoted for approximately nine degrees, the release ratchet 184 is moved in the second axial direction Dx2 to a position at which the meshing of the ratchet portions 184*a* and 195*a* of the release ratchet 184 and the driving gear 195 is released. That is, by the release ratchet 184 moving from the first position to the second position against the urging force of the compression spring 185, the clutch portion CL2 is switched from the connected state to the released state.

As mentioned above, the release lever 80 and the release link 82 are retained at the position illustrated in FIG. 16 while the rear cover 73 pivots from the closed position to the opened position passing the nine-degree position. In this state, as illustrated in FIG. 25, the release ratchet 184 is retained at the second position by a planar portion 82*e* of the release link 82. Therefore, after the clutch portion CL2 is switched from the connected state to the released state during the process of opening the rear cover 73, the released state of the clutch portion CL2 is maintained while the rear cover 73 is in the opened state. Thereby, the pressure roller 9*b* is in a freely rotatable state without receiving load from the drive transmission elements upstream of the clutch portion CL2, and the user can easily perform jam removal.

Further, as illustrated in FIG. 25, when viewed in the Z direction in a state where the pressing portion 82*b* is positioned at a position, i.e., fourth position, retaining the release ratchet 184 in the second position, the pressing portion 82*b* contacts an end face of the shaft portion 184S at a position overlapped with the axis X1. That is, when viewed in the direction, i.e., Z direction, orthogonal to both the movement direction D2 of the actuating portion moving from the third position toward the fourth position and the axial direction Dx in a state where the actuating portion is positioned at the fourth position, the actuating portion contacts the shaft portion of the intermediate member at a position overlapped with the axis X1. In other words, the pressing portion 82*b* applies force to the intermediate member at a vicinity of the rotational axis of the intermediate member.

Thereafter, when the rear cover 73 in the opened state starts to close, as mentioned above, the release lever 80 and the release link 82 move in accordance with the rear cover 73 (FIG. 17). Therefore, the pressing portion 82*b* of the release link 82 moves to a position where it does not press the shaft portion 184S of the release ratchet 184 (FIG. 23). Thereby, the release ratchet 184 moves from the second position to the first position by the urging force of the compression spring 185, and the clutch portion CL2 transits from the released state to the connected state.

Now, the operation of the clutch portion CL2 will be described of a case where jam removal is performed by the user holding and pulling out the jammed sheet exposed from the sheet discharge port 15 while the rear cover 73 is still in the closed state. In this case, the user pulls out the jammed sheet while the release ratchet 184 is still positioned at the first position illustrated in FIG. 23.

When the user pulls out the jammed sheet, the pressure roller 9*b* is pulled by the jammed sheet and rotates in the direction of rotation along the conveyance direction of the recording material. Thereby, the driven gear 194 connected to the pressure roller 9*b* via the pressure roller gear 91 and the idler gear 93 (FIG. 12) attempts to rotate in the direction of rotation R1 (FIG. 22) during drive transmission. Meanwhile, since the drive motor 311 is stopped, the release ratchet 184 attempts to stop without being rotated in the direction of rotation R1 by the inertia of the drive transmission elements from the drive motor 311 to the driving gear 195.

In the present embodiment, since the release ratchet 184 and the driving gear 195 are engaged by the ratchet portions 184*a* and 195*a*, the driving gear 195 is allowed to rotate in the direction of rotation R1 by the slipping of ratchet portions 184*a* and 195*a*. When the ratchet portions 184*a* and 195*a* slip, the release ratchet 184 moves in the second axial direction Dx2 against the urging force of the compression spring 185. Therefore, when the user draws out the jammed sheet from the sheet discharge port 15, the pressure roller 9*b* rotates while receiving a load, i.e., force caused by the urging force of the compression spring 185, smaller than the load of the drive motor 311. Therefore, even when the clutch portion CL2 is still in the connected state, jam removal in which a jammed sheet is drawn out from the sheet discharge port 15 can be performed easily.

The clutch portion CL2 according to the present embodiment is configured to be switched from the connected state to the released state by having the inclined surface 190*b* serving as the receiving portion provided on the shaft portion 184S of the release ratchet 184 pressed in the second axial direction Dx2. In other words, the shaft portion 184S of the intermediate member, or the release ratchet 84, according to the present embodiment includes a receiving portion configured to receive the force for moving the intermediate member from the first position to the second position by operation, i.e., the pressing portion 82*b* of the release link 82. The receiving portion is positioned inward of the positioning portion, i.e., the outer circumference surface of the cylindrical portion 184*g*, for positioning the driving member, or the driving gear 195, in the radial direction of rotation of the intermediate member. Therefore, even according to the configuration of the present embodiment, the space-saving property of the drive transmission mechanism capable of releasing the drive transmission from the drive source to the objects to be driven in the image forming apparatus can be enhanced.

According further to the present embodiment, the receiving portion is positioned inward of the engagement portion of the intermediate member and the engaged portion of the driving member in the radial direction of rotation of the intermediate member, such that the space-saving property of the drive transmission mechanism can be enhanced even further.

Modified Example

The embodiments described above are mere examples, and various modifications are enabled within the scope of the present technique. For example, a meshed shape in which relative rotation of the intermediate member and the driven member in both directions is restricted in the engaged state can be used instead of the configuration of engaging the release ratchet 84 and the driven gear 94 in the ratchet shape according to the first embodiment. The same applies for the ratchet shape of the release ratchet 184 and the driving gear 195 according to the second embodiment. In this case, the load of idly rotating the objects to be driven in a state where the intermediate member is still positioned at the first position is increased, but the load for idly rotating the objects to be driven in a state where the intermediate member is moved to the second position is similar to that according to the above-mentioned embodiments.

Further, the clutch portions CL1 and CL2 of the embodiments described above are not only arranged in the drive transmission path to the pressure roller 9*b* of the fixing unit 9 but also arranged in the drive transmission path to other objects to be driven, such as the roller member for conveying the recording materials in the image forming apparatus.

Further, the receiving portion can be provided at a position different from the receiving portion of the intermediate member according to the above-mentioned embodiments. For example, according to the first embodiment, a configuration is described in which the release ratchet 84 is moved from the first position to the second position by having the portion protruded from the gear cover 83 of the shaft portion 84S pressed in the first axial direction Dx. Instead, for example, the inclined surfaced member 190 similar to that of the second embodiment can be attached to the portion protruding from the drive frame 86 of the shaft portion 84S and to have the shaft portion 84S pulled in the second axial direction Dx2 by the release link 82. Moreover, according to the second embodiment, the portion protruding from the drive frame 86 of the shaft portion 84S can be pressed by the release link 82 in the second axial direction Dx2. That is, the receiving portion of these modified examples is provided at a portion of the shaft portion of the intermediate member protruding to the opposite side as the driven member interposing the driving member in the axial direction Dx.

Further according to the above-mentioned embodiments, the configuration in which the clutch portions CL1 and CL2 are switched from the connected state to the released state in accordance with the operation for opening the rear cover 73 serving as the opening/closing member has been described. The present technique is not limited thereto, and for example, the release ratchets 84 and 184 can be configured to move from the first position to the second position in accordance with the operation of a lever when the user manually manipulates a lever or the like after opening the opening/closing member. Furthermore, it is possible to adopt a configuration in which the control unit can order an actuator such as a solenoid provided in the image forming apparatus 1 to move the release ratchets 84 and 184 from the first position to the second position when the control unit of the image forming apparatus 1 detects occurrence of a sheet j am.

Other Modifications

The present disclosure illustrated embodiments in which the present technique is applied to the image forming apparatus 1 for forming an image on the recording material using the image forming unit 20 of an electrophotographic system. The present technique can also be applied to an image forming apparatus that forms an image on a recording material using an image forming unit adopting an inkjet system or an offset printing system.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201845, filed on Dec. 13, 2021, which is hereby incorporated by reference herein in its entirety.

What is claimed is:

1. An image forming apparatus comprising:

a drive source;

an object configured to be driven by the drive source; and a drive transmission mechanism configured to transmit driving force from the drive source to the object, the drive transmission mechanism including a driving member connected to the drive source and configured to be rotated around an axis by the driving force, a driven member connected to the object and configured to rotate around the axis, the driven member including an engaged portion, an intermediate member configured to rotate integrally with the driving member around the axis, the intermediate member including an engagement portion, an urging member configured to urge the intermediate member toward a first side in an axial direction of the axis, and an actuating portion configured to act on the intermediate member, wherein the intermediate member is configured to move in the axial direction to a first position in which the engagement portion of the intermediate member is engaged with the engaged portion of the driven member such that the driving force is transmitted to the driven member, and to a second position in which the engagement portion of the intermediate member is separated from the engaged portion of the driven member such that the driving force is not transmitted to the driven member, the second position being on a second side of the first position in the axial direction, the second side being opposite to the first side, wherein the intermediate member includes a shaft portion extending in the axial direction, and the shaft portion includes a positioning portion configured to determine a position of the driven member in a direction orthogonal to the axis, wherein the shaft portion further includes a receiving portion configured to receive a force, by which the intermediate member is moved from the first position to the second position, from the actuating portion, and wherein the receiving portion is positioned inward of the positioning portion in a radial direction of rotation of the intermediate member.

2. The image forming apparatus according to claim 1, further comprising:

an apparatus body in which the drive source and the drive transmission mechanism are provided;

an opening/closing member configured to open and close with respect to the apparatus body between a closed position in which the image forming apparatus is allowed to execute an image forming operation to a recording material and an opened position in which at least a portion of a conveyance path of the recording material is exposed to an exterior of the image forming apparatus; and an interconnecting mechanism configured to apply the force via the actuating portion to the receiving portion of the intermediate member in accordance with an operation of opening the opening/closing member from the closed position to the opened position.

3. The image forming apparatus according to claim 2, wherein the actuating portion is configured to move in a movement direction intersecting the axial direction, and wherein at least one of the actuating portion or the shaft portion of the intermediate member includes an inclined surface inclined to the first side in the axial direction toward the movement direction.

4. The image forming apparatus according to claim 2, wherein the interconnecting mechanism includes a movable member configured to move with respect to the apparatus body, and wherein the interconnecting mechanism is configured such that the movable member moves to cause the actuating portion to move the intermediate member from the first position to the second position while the opening/closing member is moved from the closed position to a predetermined position between the closed position and the opened position, and such that the movable member is not moved while the opening/closing member is moved from the predetermined position to the opened position.

5. The image forming apparatus according to claim 1, wherein the object includes a roller member configured to convey a recording material to which an image is formed by the image forming apparatus, wherein the engagement portion and the engaged portion function as a ratchet mechanism, and wherein the ratchet mechanism is configured to allow the roller member to rotate freely in a predetermined direction in a state where the intermediate member is positioned at the first position and where the drive source is stopped.

6. The image forming apparatus according to claim 1, wherein the actuating portion is configured to move to a position overlapped with the axis when viewed in the axial direction.

7. The image forming apparatus according to claim 6, wherein the actuating portion includes an abutment surface configured to abut against the shaft portion of the intermediate member at the position overlapped with the axis when viewed in the axial direction, to hold the intermediate member at the second position against an urging force of the urging member.

8. The image forming apparatus according to claim 1, wherein the driven member is a helical gear, and wherein a direction of a tooth trace of the helical gear is inclined such that the helical gear is pressed against the intermediate member by a force that the helical gear receives from a tooth of a gear meshing with the helical gear when the driving force is transmitted.

9. The image forming apparatus according to claim 1, wherein the driven member includes a hole portion having a cylindrical shape that extends in the axial direction around the axis, and wherein the positioning portion of the intermediate member is an arc surface configured to support an inner circumference surface of the hole portion in a slidable manner.

10. The image forming apparatus according to claim 1, wherein the driving member and the driven member are each an annular member through which the shaft portion of the intermediate member is passed in the axial direction.

11. The image forming apparatus according to claim 10, wherein the receiving portion is disposed at a part of the shaft portion protruded through the driven member to an opposite side from the driving member in the axial direction, or at a part of the shaft portion protruded through the driving member to an opposite side from the driven member in the axial direction.

12. The image forming apparatus according to claim 1, further comprising a first supporting portion and a second supporting portion configured to support the drive transmission mechanism, wherein the shaft portion of the intermediate member is supported rotatably by the first supporting portion at the first side in the axial direction, and is supported rotatably by the second supporting portion at the second side in the axial direction, and wherein the driving member and the driven member are each arranged between the first supporting portion and the second supporting portion in the axial direction in a state where the driving member and the driven member are supported by the intermediate member.

13. The image forming apparatus according to claim 1, wherein regarding the radial direction, the receiving portion is positioned inward of the engagement portion of the intermediate member, and is positioned inward of the engaged portion of the driven member.

14. An image forming apparatus comprising:

a drive source;

an object configured to be driven by the drive source; and a drive transmission mechanism configured to transmit driving force from the drive source to the object, the drive transmission mechanism including a driving member connected to the drive source and configured to be rotated around an axis by the driving force, the driving member including an engaged portion, a driven member connected to the object and configured to rotate around the axis, an intermediate member configured to rotate integrally with the driven member around the axis, the intermediate member including an engagement portion, an urging member configured to urge the intermediate member toward a first side in an axial direction of the axis, and an actuating portion configured to act on the intermediate member, wherein the intermediate member is configured to move in the axial direction to a first position in which the engagement portion of the intermediate member is engaged with the engaged portion of the driving member such that the intermediate member receives the driving force from the driving member, and to a second position in which the engagement portion of the intermediate member is separated from the engaged portion of the driving member such that the intermediate member does not receive the driving force from the driving member, the second position being on a second side of the first position in the axial direction, the second side being opposite to the first side, wherein the intermediate member includes a shaft portion extending in the axial direction, and a positioning portion configured to determine a position of the driving member in a direction orthogonal to the axis, wherein the shaft portion includes a receiving portion configured to receive a force, by which the intermediate member is moved from the first position to the second position, from the actuating portion, and wherein the receiving portion is positioned inward of the positioning portion in a radial direction of rotation of the intermediate member.

15. The image forming apparatus according to claim 14, further comprising:

an apparatus body in which the drive source and the drive transmission mechanism are provided;

an opening/closing member configured to open and close with respect to the apparatus body between a closed position in which the image forming apparatus is allowed to execute an image forming operation to a recording material and an opened position in which at least a portion of a conveyance path of the recording material is exposed to an exterior of the image forming apparatus; and an interconnecting mechanism configured to apply the force via the actuating portion to the receiving portion of the intermediate member in accordance with an operation of opening the opening/closing member from the closed position to the opened position.

16. The image forming apparatus according to claim 15, wherein the actuating portion is configured to move in a movement direction intersecting the axial direction, and wherein at least one of the actuating portion or the shaft portion of the intermediate member includes an inclined surface inclined to the first side in the axial direction toward the movement direction.

17. The image forming apparatus according to claim 15, wherein the interconnecting mechanism includes a movable member configured to move with respect to the apparatus body, and wherein the interconnecting mechanism is configured such that the movable member moves to cause the actuating portion to move the intermediate member from the first position to the second position while the opening/closing member is moved from the closed position to a predetermined position between the closed position and the opened position, and such that the movable member is not moved while the opening/closing member is moved from the predetermined position to the opened position.

18. The image forming apparatus according to claim 14, wherein the object includes a roller member configured to convey a recording material to which an image is formed by the image forming apparatus, wherein the engagement portion and the engaged portion function as a ratchet mechanism, and wherein the ratchet mechanism is configured to allow the roller member to rotate freely in a predetermined direction in a state where the intermediate member is positioned at the first position and where the drive source is stopped.

19. The image forming apparatus according to claim 14, wherein the actuating portion is configured to move to a position overlapped with the axis when viewed in the axial direction.

20. The image forming apparatus according to claim 19, wherein the actuating portion includes an abutment surface configured to abut against the shaft portion of the intermediate member at the position overlapped with the axis when viewed in the axial direction, to hold the intermediate member at the second position against an urging force of the urging member.

21. The image forming apparatus according to claim 14, wherein the driving member is a helical gear, and wherein a direction of a tooth trace of the helical gear is inclined such that the helical gear is pressed against the intermediate member by a force that the helical gear receives from a tooth of a gear meshing with the helical gear when the driving force is transmitted.

22. The image forming apparatus according to claim 14, wherein the driving member includes a hole portion having a cylindrical shape that extends in the axial direction around the axis, and wherein the positioning portion of the intermediate member is an arc surface configured to support an inner circumference surface of the hole portion in a slidable manner.

23. The image forming apparatus according to claim 14, wherein the driving member and the driven member are each an annular member through which the shaft portion of the intermediate member is passed in the axial direction.

24. The image forming apparatus according to claim 23, wherein the receiving portion is disposed at a part of the shaft portion protruded through the driven member to an opposite side from the driving member in the axial direction, or at a part of the shaft portion protruded through the driving member to an opposite side from the driven member in the axial direction.

25. The image forming apparatus according to claim 14, further comprising a first supporting portion and a second supporting portion configured to support the drive transmission mechanism, wherein the shaft portion of the intermediate member is supported rotatably by the first supporting portion at the first side in the axial direction, and is supported rotatably by the second supporting portion at the second side in the axial direction, and wherein the driving member and the driven member are each arranged between the first supporting portion and the second supporting portion in the axial direction in a state where the driving member and the driven member are supported by the intermediate member.

26. The image forming apparatus according to claim 14, wherein regarding the radial direction, the receiving portion is positioned inward of the engagement portion of the intermediate member, and is positioned inward of the engaged portion of the driving member.

* * * * *